United States Patent
Oya

(10) Patent No.: US 8,003,224 B2
(45) Date of Patent: *Aug. 23, 2011

(54) METHOD FOR PRODUCING CELLULOSE ACYLATE COMPOSITION AND CELLULOSE ACYLATE FILM

(75) Inventor: Toyohisa Oya, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1092 days.

This patent is subject to a terminal disclaimer.

(21) Appl. No.: 11/768,426

(22) Filed: Jun. 26, 2007

(65) Prior Publication Data

US 2008/0003443 A1 Jan. 3, 2008

(30) Foreign Application Priority Data

Jun. 28, 2006 (JP) .................. 2006-178685
Aug. 21, 2006 (JP) .................. 2006-224372

(51) Int. Cl.
- *B32B 23/04* (2006.01)
- *B32B 29/00* (2006.01)
- *C09K 19/00* (2006.01)
- *C08K 3/00* (2006.01)
- *C09J 1/00* (2006.01)

(52) U.S. Cl. ......... 428/532; 428/533; 428/536; 428/1.2; 106/170.57; 524/401

(58) Field of Classification Search .......... None
See application file for complete search history.

(56) References Cited

U.S. PATENT DOCUMENTS 7,521,127 B2 * 4/2009 Oya .................. 428/532

FOREIGN PATENT DOCUMENTS

| JP | 2000-352620 A | 12/2000 |
| JP | 2001-188128 A | 7/2001 |
| JP | 2003-213004 A | 7/2003 |
| JP | 2006-045500 A | 2/2006 |

* cited by examiner

*Primary Examiner* — Sheeba Ahmed
(74) *Attorney, Agent, or Firm* — Buchanan Ingersoll & Rooney PC

(57) ABSTRACT

A method for producing a cellulose acylate composition, which comprises filtering a solution in which cellulose acylate satisfying the following formulae 1 to 3 and having melt viscosity of 150 to 1000 Pa·s at 230° C. is dissolved in a solvent through a filter having a retention particle size of 0.1 to 40 μm, and mixing the filtered solution with a poor solvent to reprecipitate cellulose acylate:

$1.5 \leq A+B \leq 3$  Formula 1

$0 \leq A \leq 2.0$  Formula 2

$1.0 \leq B \leq 3$  Formula 3 where A is a substitution degree for an acetyl group of a hydrogen atom which constitutes a hydroxyl group of cellulose, and B is a substitution degree for an acyl group having 3 to 7 carbon atoms of a hydrogen atom which constitutes a hydroxyl group of cellulose.

8 Claims, No Drawings

METHOD FOR PRODUCING CELLULOSE ACYLATE COMPOSITION AND CELLULOSE ACYLATE FILM

BACKGROUND OF THE INVENTION

1. Field of the Invention

The present invention relates to a cellulose acylate composition which contains a very small amount of fine impurity and is useful for an optical film, and a method for producing the same. Furthermore, the invention pertains to a high grade optical film, a retardation film, a polarizing plate, an optical compensation film, an anti-reflection film, and an image display device employing the above-mentioned cellulose acylate.

2. Description of the Related Art

Due to the transparency, toughness, and optical isotropy, cellulose acetate is increasingly finding its usefulness in a variety of applications, including the use in the support of photographic sensitive materials, as well as the use in optical films for image display devices including liquid crystal display devices and organic EL display devices. With regard to the optical film for liquid crystal display devices, methods of using cellulose acetate for polarizing plate protective films, or for retardation films for liquid crystal display devices of STN (Super Twisted Nematic) mode or the like by stretching the film to attain in-plane retardation (Re) and retardation in the thickness direction (Rth), are being implemented.

In recent years, there have been developed display devices of VA (Vertical Alignment) mode, OCB (Optical Compensated Bend) mode, or IPS (In-Plane Switching) mode, where higher values of retardation such as Re and Rth are required compared with the STN mode. Thus, an optical film material having property of manifesting various types of retardation according to the type of liquid crystal mode is on demand.

Stretchability of cellulose acetate is poor, and an area where retardation due to stretching and alignment of only polymer is realized is limited. Furthermore, since cellulose acetate is a relatively hydrophilic polymer, a change in retardation caused by humidity is significant.

In order to cope with such demand, a cellulose acylate film has been disclosed as a new material for optical film, which is produced by a solution casting method in which a solution of mixed esters of an acetyl group and a propionyl group of cellulose (mixed acylate of cellulose such as cellulose acetate propionate) is flow cast on a support, a portion of the solvent is evaporated, and then a cellulose acylate film is peeled off from the support (see JP-A-2001-188128). In addition, there is a process in which cellulose acetate butyrate and cellulose acetate propionate are used as mixed acylate of cellulose that has a melting temperature lower than that of cellulose acetate and then melt cast to form an optical film (see JP-A-2000-352620). The melt casting has the following advantages. Since an organic solvent is not used during the casting, a dissolution or dry process may be omitted unlike the solution casting, and a load to environment is low.

Mixed acylate of cellulose such as cellulose acetate propionate and cellulose acetate butyrate is an excellent material that increases retardation of cellulose acetate. Meanwhile, in the case of when a process where cellulose and acid anhydrides that are industrially available are reacted in the presence of an acid catalyst to produce cellulose acylate is used, reactivity is lower as compared to cellulose acetate, impurities including unreacted cellulose may easily remain. The impurities are observed as black point impurities or bright point impurities under a crossed Nicols condition. In the case of when cellulose acylate is used as an optical film, optical defects may be formed or light leakage may occur, thus it is required that the amount of impurities is set to be very small.

An activation process in which an acetic acid is added to raw material cellulose and a temperature is maintained at 40° C. for 1 hour or more is disclosed as a process of reducing unreacted cellulose of mixed acylate of cellulose (see JP-A-2006-45500).

This process is useful to reduce the amount of unreacted substances while the degree of polymerization of cellulose acylate is maintained at a relatively high level. However, it is difficult to remove impurities other than unreacted cellulose, and when the required amount of unreacted substance is very small, it is necessary to perform a process of removing the impurities.

In the case of when cellulose acylate is used as a raw material of the optical film, if the casting process is the solution casting process, even though cellulose acylate containing a large amount of impurity is used, a cellulose acylate solution is prepared, filtered by using a filter having a small retention particle size, and cast to significantly reduce the amount of impurity of products (see JP-A-2003-213004).

Furthermore, a process of filtering melts of cellulose ester in the case of when the melt casting is performed is disclosed. In the process, desirable filtration precision is 5 μm or less (see JP-A-2000-352620). However, there is a problem in that replacement of a filtering material during the filtration of the melts is more difficult as compared to the filtration of the solution.

Therefore, in order to produce cellulose acylate useful to provide acceptable optical properties when the melt casting is performed, it is required that the amount of fine impurity contained in the raw material of cellulose acylate used to perform the melting is set to be very small to make the filtration of melts unnecessary. However, this is difficult to be achieved by using a known method, thus there is a need to provide a method of solving this problem.

SUMMARY OF THE INVENTION

It is an object of the invention to provide a method for producing cellulose acylate composition which contains a very small amount of fine impurity and is useful for an optical film. It is another object of the invention to provide a high grade optical film, a retardation film, a polarizing plate, an optical compensation film, an anti-reflection film, and an image display device employing the above-mentioned cellulose acylate.

In order to obtain an acceptable optical film, it is required that the amount of impurity having a retention particle size of 40 μm or more is set to 0.1 or less pieces of particles per 1 g of the cellulose acylate composition. However, it has been considered that it is industrially impossible to remove the impurity having a retention particle size of 40 μm or more from the melts so that the amount of the impurity is in the above-mentioned range.

Accordingly, the present inventors have devotedly conducted researches, and as a result, these found that when cellulose acylate constituting a cellulose acylate composition which satisfies Formulae 1 to 3 and has a melt viscosity of 150 to 1000 Pa·s at 230° C. is dissolved in a solvent to form a solution and the solution is filtered by using a filter having a retention particle size of 0.1 to 40 μm and mixed with a poor solvent to reprecipitate cellulose acylate, cellulose acylate is useful to a melt casting process to appropriately remove the impurity and prevent fragileness of the film from being made worse, thereby accomplishing the invention.

The above-mentioned objects of the invention are achieved by the following aspects of the invention.
(1) A method for producing a cellulose acylate composition, which comprises filtering a solution in which cellulose acylate satisfying the following formulae 1 to 3 and having melt viscosity of 150 to 1000 Pa·s at 230° C. is dissolved in a solvent through a filter having a retention particle size of 0.1 to 40 μm, and mixing the filtered solution with a poor solvent to reprecipitate cellulose acylate:

$$1.5 \leq A+B \leq 3 \quad \text{Formula 1}$$

$$0 \leq A \leq 2.0 \quad \text{Formula 2}$$

$$1.0 \leq B \leq 3 \quad \text{Formula 3}$$

where A is a substitution degree for an acetyl group of a hydrogen atom which constitutes a hydroxyl group of cellulose, and B is a substitution degree for an acyl group having 3 to 7 carbon atoms of a hydrogen atom which constitutes a hydroxyl group of cellulose.
(2) The method for producing the cellulose acylate composition according to (1), wherein the cellulose acylate used in the solution has a weight average molecular weight measured by a gel permeation chromatography of 80,000 to 180,000.
(3) The method for producing the cellulose acylate composition according to (1) or (2), wherein the filter has a retention particle size of 2 to 20 μm.
(4) The method for producing the cellulose acylate composition according to any one of (1) to (3), wherein a filter aid is used during the filtering.
(5) The method for producing the cellulose acylate composition according to any one of (1) to (4), wherein the reprecipitated cellulose acylate comprises 10 pieces or less of impurity particles having a particle size of 40 μm or more per 100 g of the cellulose acylate.
(6) The method for producing the cellulose acylate composition according to any one of (1) to (4), wherein the reprecipitated cellulose acylate comprises 5 pieces or less of impurity particles having a particle size of 40 μm or more per 100 g of the cellulose acylate.
(7) The method for producing the cellulose acylate composition according to any one of (1) to (6), wherein the cellulose acylate composition is in the form of a solution, a melt, a gel, a pellet, or a film.
(8) The method for producing the cellulose acylate composition according to any one of (1) to (6), wherein the cellulose acylate composition is in the form of a pellet or a film.
(9) A cellulose acylate film produced by the method for producing the cellulose acylate composition according to any one of (1) to (8).
(10) The cellulose acylate film according to (9), wherein the amount of remaining organic solvent is 0.03% by mass or less.
(11) The cellulose acylate film according to (9) or (10), which has an in-plane retardation (Re) satisfying the following formula i and a retardation in the thickness direction (Rth) satisfying the following formula ii:

$$-500 \text{ nm} \leq Re \leq 500 \text{ nm} \quad \text{Formula i}$$

$$-500 \text{ nm} \leq Rth \leq 500 \text{ nm}. \quad \text{Formula ii}$$

(12) The cellulose acylate film according to any one of (9) to (11), which is obtained by stretching the cellulose acylate film according to claim 9 in at least one direction by 0.1 to 500%.
(13) A retardation film comprising the cellulose acylate film according to any one of (9) to (12).
(14) A polarizing plate comprising a polarizing layer and a protective film provided on at least one side of the polarizing layer, wherein the protective film is the cellulose acylate film according to any one of (9) to (12) or the retardation film according to (13).
(15) An optical compensation film comprising an optically anisotropic layer formed by aligning a liquid crystalline compound on the cellulose acylate film according to any one of (9) to (12) or the retardation film according to (13).
(16) An anti-reflection film comprising an anti-reflection layer on the cellulose acylate film according to any one of (9) to (12) or the retardation film according to (13).
(17) An image display device comprising one or more selected from the group consisting of the cellulose acylate film according to any one of (9) to (12), the retardation film according to (13), the polarizing plate according to (14), the optical compensation film according to (15), and the anti-reflection film according to (16).

BEST MODE FOR CARRYING OUT THE INVENTION

A cellulose acylate composition according to a production method of the invention contains a very small amount of fine impurity and is useful for an optical film, particularly, an optical film using a melt casting process. Furthermore, a high grade optical film, a retardation film, a polarizing plate, an optical compensation film, an anti-reflection film, and an image display device employing the above-mentioned cellulose acylate are of good quality and have excellent optical properties.

BEST MODE FOR CARRYING OUT THE INVENTION

Hereinafter, a cellulose acylate composition and a method for producing the same according to an aspect of the invention will be described in detail. The explanation of the constitutional requirements described below is based on the representative embodiments of the invention, but the invention is not intended to be limited by those embodiments. In addition, the numerical value range expressed with symbol " . . . to . . . " in the present specification implies that the range includes the values described before and after the symbol " . . . to . . . " as the lower limit value and the upper limit value.
<Cellulose Acylate>
A detailed description will be given of cellulose acylate which is preferably used in the method according to the aspect of the invention.
(Basic Structure)
The β-1,4-bonded glucose unit constituting the cellulose has free hydroxyl groups at the 2-position, 3-position, and 6-position. Cellulose acylate is a polymerized product (polymer) having part or all of the hydroxyl groups that are chemically-modified. In the aspect of the invention, the term "substitution degree" indicates the sum of the ratios at which the hydroxyl groups of cellulose are substituted in respect to the 2-position, 3-position, and 6-position (for example, esterification of 100% means that the degree substitution is 1). Furthermore, a natural cellulose raw material may contain a polymer (hemicellulose) of sugars (for example, xylose, mannose, or the like) other than glucose or components other than cellulose, for example, lignin, according to the type of its original living things or purification process. However, in the aspect of the invention, a polymer that is produced by using the cellulose raw material containing them is described generically as cellulose acylate.

The cellulose acylate according to the aspect of the invention satisfies the following formulae 1 to 3:

$$1.5 \leq A+B \leq 3 \quad \text{Formula 1}$$

$$0 \leq A \leq 2.0 \quad \text{Formula 2}$$

$$1.0 \leq B \leq 3 \quad \text{Formula 3}$$

In formulae, A represents a substitution degree for an acetyl group in respect to a hydrogen atom that constitutes a hydroxyl group of cellulose, and B represents a substitution degree for an acyl group having 3 to 7 carbon atoms in respect to a hydrogen atom that constitutes a hydroxyl group of cellulose.

(Substituent Designated by B)

In the aspect of the invention, the substituent that is designated by B has preferably 11 carbon atoms or less, more preferably 3 to 6 carbon atoms, and particularly preferably 3 or 4 carbon atoms. If the number of carbon atoms is set to 11 or less, processability is apt to be improved. If cellulose acylate is used for films, a glass transition temperature of the polymer is more preferable.

Preferable examples of the substituent may include a propionyl group, a butyryl group, a pentanoyl group, a heptanoyl group, a hexanoyl group, an isobutyryl group, a pivaloyl group, and the like. More preferred are a propionyl group, a butyryl group, a hexanoyl group, and most preferred are a propionyl group and a butyryl group.

It is preferable that the cellulose acylate according to the aspect of the invention satisfy the following formulae 4 to 6:

$$2.0 \leq A+B \leq 3 \quad \text{Formula 4}$$

$$0.05 \leq A \leq 2.0 \quad \text{Formula 5}$$

$$1.0 \leq B \leq 2.95 \quad \text{Formula 6}$$

It is more preferable that the cellulose acylate according to the aspect of the invention satisfy the following Formulae 7 to 9:

$$2.5 \leq A+B \leq 2.99 \quad \text{Formula 7}$$

$$0.1 \leq A \leq 1.5 \quad \text{Formula 8}$$

$$1.2 \leq B \leq 2.9 \quad \text{Formula 9}$$

It is most preferable that the cellulose acylate according to the aspect of the invention satisfy the following Formulae 10 to 12:

$$2.6 \leq A+B \leq 2.98 \quad \text{Formula 11}$$

$$0.1 \leq A \leq 1.2 \quad \text{Formula 12}$$

$$1.3 \leq B \leq 2.85 \quad \text{Formula 13}$$

In the case of when A+B is less than 1.5, hydrophilicity of cellulose acylate excessively increases, resulting in increased humidity dependency of the cellulose acylate composition, and thus it is not desirable. In the case of when A+B is 2.0 or more, since it is possible to obtain an optical film having acceptable humidity dependency, it is desirable. In the aspect of the invention, A+B is preferably 2.5 or more, more preferably 2.6 or more, and particularly preferably 2.7 or more.

A may have any value in the range of 0 to 2. In the case of when the cellulose acylate composition according to the aspect of the invention is a film, A is preferably 0.05 or more, more preferably 0.1 or more, and particularly preferably 0.2 or more in order to obtain desirable optical properties. As to the upper limit thereof, A is preferably 1.5 or less and more preferably 1.2 or less in views of cost, the shape of the film surface, and the like.

B may have any value in the range of 1 to 3. In the case of when the cellulose acylate composition according to the aspect of the invention is a film, B is preferably 1.0 or more, more preferably 1.2 or more, and particularly preferably 1.3 or more in order to obtain desirable optical properties, mechanical properties, and castability. As to the upper limit thereof, B is preferably 2.95 or less, more preferably 2.9 or less, and particularly preferably 2.85 or less in views of optical properties and processability.

Preferable examples of cellulose acylate that is used in the aspect of the invention may include cellulose acetate propionate, cellulose acetate butyrate, cellulose acetate heptanoate, cellulose acetate hexanoate, and cellulose acetate pentanoate. More preferable are cellulose acetate propionate, cellulose acetate butyrate, cellulose acetate heptanoate, and cellulose acetate hexanoate. Most preferable are cellulose acetate propionate and cellulose acetate butyrate.

<Method for Producing Cellulose Acylate>

(Raw Material and Pretreatment)

For the cellulose raw material, materials derived from hardwood pulp, softwood pulp, and cotton linter are preferably used. For the cellulose raw material, materials of high purity having a α-cellulose content of 92 to 99.9% by mass are preferably used.

When the cellulose raw material is in a sheet form or in a lump form, the material is preferably pulverized in advance, and the cellulose is preferably continued to be pulverized until a fluffy state, a feather state, or a power state is attained.

(Activation Process)

In the aspect of the invention, the cellulose raw material is preferably subjected to a pretreatment (activation) of coming into contact with an activating agent, prior to etherification. In the case of when etherification is performed, water or a sodium hydroxide aqueous solution is preferably used as an activating agent. In the case of when esterification is performed, a carboxylic acid is preferably used. The method of addition can be selected from methods of spraying, dropping, immersion, and the like, and the activation may be performed at a predetermined temperature for a predetermined time. Details of the activation treatment are disclosed in JP-A-2006-45500.

(Acylation Process)

In order to produce cellulose acylate according to the aspect of the invention, cellulose is preferably acylated in the presence of catalyst. Specifically, it is preferable to acylate the hydroxyl group of cellulose by adding a carboxylic acid anhydride to cellulose and reacting them in the presence of a Brønsted acid or Lewis acid as the catalyst. For the catalyst, a sulfuric acid can be favorably used. The synthesis of cellulose acylate having the large substitution degree at 6-position is disclosed in JP-A-1999-5851, JP-A-2002-212338, JP-A-2002-338601, or the like.

(Acid Anhydride)

The acid anhydride of carboxylic acid is preferably an acid anhydride of a carboxylic acid having 2 to 7 carbon atoms, and examples thereof may include anhydrous acetic acid, propionic acid anhydride, butyric acid anhydride, 2-methylpropionic acid anhydride, valeric acid anhydride, 3-methylbutyric acid anhydride, 2-methylbutyric acid anhydride, 2,2-dimethylpropionic acid anhydride (pivalic acid anhydride), hexanoic acid anhydride, 2-methylvaleric acid anhydride, 3-methylvaleric acid anhydride, 4-methylvaleric acid anhydride, 2,2-dimethylbutyric acid anhydride, 2,3-dimethylbutyric acid anhydride, 3,3-dimethylbutyric acid anhydride, cyclopentanecarboxylic acid anhydride, heptanoic acid anhydride, cyclohexanecarboxylic acid anhydride, benzoic acid anhydride, and the like. More preferred ones are anhydrous acetic acid, propionic acid anhydride, butyric acid anhydride, valeric acid anhydride, hexanoic acid anhydride, and heptanoic acid anhydride, and particularly preferred ones are anhydrous acetic acid, propionic acid anhydride, and butyric acid anhydride.

For the method of obtaining a mixed acylate of cellulose, it is preferable to use these acid anhydrides in combination. The mixing ratio is preferably determined in accordance with the rate of substitution of the target mixed ester. The acid anhydride is usually added in an equivalent excess with respect to the cellulose. That is, the acid anhydride is preferably added in an amount of 1.1 to 50 equivalents, more preferably 1.2 to 30 equivalents, and particularly preferably 1.3 to 10 equivalents, with respect to the hydroxyl group of the cellulose.

For a mixed acylation method, mention may be made of a method of mixing or sequentially adding two types of carboxylic acid anhydrides and allowing them to react, a method of using a mixed acid anhydride of two types of carboxylic acids (for example, mixed acid anhydride of an acetic acid and a butyric acid), and a method of using acid anhydrides of a carboxylic acid and a different carboxylic acid (for example, acetic acid anhydride and butyric acid anhydride) as the starting materials to synthesize a mixed acid anhydride (for example, mixed acid anhydride of an acetic acid and a butyric acid) in the reaction system and reacting the mixed acid anhydride with cellulose.

(Catalyst)

For the catalyst for acylation used for the production of the cellulose acylate according to the aspect of the invention, it is preferable to use a Brønsted acid or a Lewis acid. The definitions for the Brønsted acid and the Lewis acid are described in, for example, "Encyclopedia of Physics and Chemistry", Vol. 5 (2000). Preferred examples of the Brønsted acid may include a sulfuric acid, a perchloric acid, a phosphoric acid, a methanesulfonic acid, a benzenesulfonic acid, a p-toluenesulfonic acid, and the like. Preferred examples of the Lewis acid may include zinc chloride, tin chloride, antimony chloride, magnesium chloride, and the like.

For the catalyst, the sulfuric acid or the perchloric acid is more preferred, and the sulfuric acid is particularly preferred. It is preferable to use the sulfuric acid and other catalysts in combination. A preferred amount of addition for the catalyst is 0.1 to 30% by mass, more preferably 1 to 15% by mass, and particularly preferably 3 to 12% by mass, with respect to the cellulose.

(Solvent)

In carrying out the acylation, a solvent may be added for the purpose of adjusting the viscosity, rate of reaction, stirrability, ratio of acyl substitution, or the like. For the solvent, dichloromethane, chloroform, carboxylic acid, acetone, ethyl methyl ketone, toluene, dimethylsulfoxide, sulfolane, or the like may be used, but preferably used are carboxylic acids. Examples of such carboxylic acid may include a carboxylic acid having 2 to 7 carbon atoms (for example, an acetic acid, a propionic acid, a butyric acid, a 2-methylpropionic acid, a valeric acid, a 3-methylbutyric acid, a 2-methylbutyric acid, a 2,2-dimethylpropionic acid (pivalic acid), a hexanoic acid, a 2-methylvaleric acid, a 3-methylvaleric acid, a 4-methylvaleric acid, a 2,2-dimethylbutyric acid, a 2,3-dimethylbutyric acid, a 3,3-dimethylbutyric acid, a cyclopentanecarboxylic acid), and the like, and more preferably, the acetic acid, propionic acid, the butyric acid, and the like. These solvents may be used in mixtures.

(Conditions for Acylation)

In carrying out the acylation, an acid anhydride, a catalyst, and optionally a solvent may be mixed first, and then cellulose may be mixed with these, or alternatively, the acid anhydride, catalyst and solvent may be separately and sequentially mixed with cellulose. However, it is usually preferable to prepare a mixture of an acid anhydride and a catalyst, or a mixture of an acid anhydride, a catalyst, and a solvent, as the acylating agent, and then to react the mixture with cellulose. In order to suppress temperature elevation in the reactor due to the heat of reaction upon acylation, the acylating agent is preferably cooled in advance. The cooling temperature is preferably −50 to 20° C., more preferably −35 to 10° C., and particularly preferably −25 to 5° C. The acylating agent may be added in the liquid state, or in the solid state by freezing the agent into a crystal, flake, or block form.

In addition, the acylating agent may be added all at once or may be added in portions, to the cellulose. Alternatively, cellulose may be added all at once or may be added in portions, to the acylating agent. In the case of when the acylating agent is added in portions, an acylating agent of identical composition may be used, or a plurality of acylating agents of different compositions may be used. For preferred methods, mention may be made of 1) a method of first adding a mixture of an acid anhydride and a solvent and then adding a catalyst, 2) a method of first adding a mixture of an acid anhydride, a solvent, and a portion of a catalyst, and then adding a mixture of the other potion of the catalyst and a solvent, 3) a method of first adding a mixture of an acid anhydride and a solvent, and then a mixture of a catalyst and the solvent, 4) a method of first adding a solvent, and then a mixture of an acid anhydride and a catalyst, or a mixture of an acid anhydride, a catalyst and a solvent, and the like.

The acylation of cellulose is an exothermic reaction, but for the method for producing cellulose acylate according to the aspect of the invention, it is preferable if the maximum reached temperature during acylation is 50° C. or lower. When the reaction temperature is 50° C. or lower, it is preferable because a situation where depolymerization proceeds, making it difficult to obtain cellulose acylate having degrees of polymerization appropriate for the uses of the invention, or the like does not occur. The maximum reached temperature upon the acylation is preferably 45° C. or lower, more preferably 40° C. or lower, even more preferably 35° C. or lower, and particularly preferably 30° C. or lower. The reaction temperature may be controlled by using a temperature adjusting device, or may be controlled by means of the initial temperature of the acylating agent. The reaction temperature may be also controlled by the heat of vaporization of liquid components in the reaction system, generated by pressure reduction in the reactor. In addition, since the exotherm of the acylation is significant at the beginning of the reaction, the temperature may be controlled by cooling the reaction system during the initiation of the reaction and then heating the system, or the like. The termination point of the acylation may be determined by such means as the light permeability, solution viscosity, a change in temperature of the reaction system, solubility of the reactants to an organic solvent, observation with a polarized microscope, and the like.

The minimum temperature of the reaction is preferably −50° C. or more, more preferably −30° C. or more, and particularly preferably −20° C. or more. Time for acylation is preferably 0.5 to 24 hours, more preferably 1 to 12 hours, and particularly preferably 1.5 to 6 hours. For 0.5 hours, the reaction does not proceed sufficiently under normal reaction conditions, while the reaction time exceeding 24 hours is not preferable in the aspect of industrial production.

(Acyl Composition)

The degree of acylation preferably satisfies the following Formula B:

$$0 \leq (MA/MB) \leq 2.0 \quad \text{Formula B}$$

In Formula B, MA represents the total molar amount of the acetyl group contained in the reaction mixture for the acylation process. Specifically, MA is the summed molar amount of the acetyl group contained in the acylating agent, the acetyl group contained in the carboxylic acid used for the pretreatment process, and the acetyl group contained in the produced cellulose acylate. MB represents the total molar amount of the acyl group having 3 to 7 carbon atoms contained in the reaction mixture for the acylation process. Specifically, MB is the summed molar amount of the acyl group having 3 to 7 carbon atoms contained in the acylating agent, the acyl group having 3 to 7 carbon atoms contained in the carboxylic acid used for the pretreatment process, and the acyl group having 3 to 7 carbon atoms contained in the produced cellulose acylate.

As such, the total molar amount of the acetyl group and the total molar amount of the acyl group having 3 to 7 carbon atoms are determined by the compositions and amounts of the activating agent, acylating agent (acid anhydride and carboxylic acid) and solvent (carboxylic acid) used in the pretreatment process. According to the aspect of the invention, the amount of the acyl group of acid anhydride is calculated in terms of the constituting carboxylic acid. That is, it is calculated such that 1 mole of an acid anhydride is equivalent to 2 moles of an acyl group. Likewise, the number of moles of the acyl group in the produced cellulose acylate is calculated in terms of the carboxylic acid generated when all of the ester bonds are hydrolyzed. Although the amounts of the acid anhydride and carboxylic acid in the reaction mixture are sequentially changed as the acylation of cellulose proceeds, by performing the calculation, the total number of moles of all the acyl groups contained in the acid anhydride, carboxylic acid, and produced cellulose acylate in the reaction mixture is constant throughout the process of acylation, as long as no new acid anhydride or carboxylic acid is added to the reaction system.

The acylation process according to the aspect of the invention refers to the period from the initiation of acylation of the hydroxyl groups of cellulose to the point when substantially most of the hydroxyl groups of the cellulose are acylated (for example, the substitution degree for an acyl group is 2.0 or greater, preferably 2.5 or greater, more preferably 2.8 or greater, and particularly preferably 2.9 or greater), and does not include the phase where the acylation is substantially almost completed, and further addition of acid anhydride or carboxylic acid to the reaction system has virtually no effect on the acyl composition of the product cellulose acylate.

According to the aspect of the invention, MA/MB is preferably such that $0<(MA/MB)\leq 2.0$, more preferably $0.001\leq(MA/MB)\leq 1.5$, even more preferably $0.01\leq(MA/MB)\leq 1.0$, and particularly preferably $0.05\leq(MA/MB)\leq 0.7$. When MA/MB exceeds 2, the substitution degree for an acetyl group of the cellulose acylate becomes excessively high, and there may be problems such as deterioration of stretchability, increase of the melting temperature for melt casting, resulting in difficult casting, and the like.

(Reaction Terminating Agent)

According to the method for producing cellulose acylate used in the aspect of the invention, it is desirable to add a reaction terminating agent after the acylation reaction.

For the reaction terminating agent, any substance capable of decomposing acid anhydrides may be used, and preferred examples thereof may include water, alcohol (for example, ethanol, methanol, propanol, isopropyl alcohol, etc.) or compositions containing these, and the like. Further, the reaction terminating agent may contain a neutralizing agent to be described later. Upon addition of the reaction terminating agent, a large exotherm surpassing the cooling capacity of the reactor apparatus is generated, possibly causing a decrease in the degree of polymerization of cellulose acylate, precipitation of cellulose acylate into an undesired form, or the like. Thus, in order to avoid such inconveniences, it is preferable to add a mixture of water and a carboxylic acid such as acetic acid, propionic acid, butyric acid, or the like, rather than to directly add water or alcohol, and the acetic acid is particularly preferable as the carboxylic acid. The composition ratio of the carboxylic acid and water used may be at any arbitrary ratio, but it is preferable to have the content of water in the range of 5 to 80% by mass, more preferably 10 to 60% by mass, and particularly preferably 15 to 50% by mass.

The reaction terminating agent may be added to the acylation reactor, or the reactants may be added to the vessel of the reaction terminating agent. The reaction terminating agent is preferably added over a time period of 3 minutes to 3 hours. When the time for addition of the reaction terminating agent is 3 minutes or more, there does not occur a situation where the exotherm becomes excessively large, causing a decrease in the degree of polymerization, insufficient hydrolysis of the acid anhydride, reduced stability of the cellulose acylate, or the like, and thus it is desirable. When the time for addition of the reaction terminating agent is less than or equal to 3 hours, there does not occur a problem such as deterioration of industrial productivity or the like, and it is desirable. The time for addition of the reaction terminating agent is preferably 4 minutes to 2 hours, more preferably 5 minutes to 1 hour, and particularly preferably 10 minutes to 45 minutes. Upon addition of the reaction terminating agent, the reactor may be cooled or not cooled, but for the purpose of inhibiting depolymerization, it is also desirable to inhibit temperature increase by cooling the reactor. It is also preferable to have the reaction terminating agent cooled in advance.

(Neutralizing Agent)

During the process of acylation reaction termination or after the process of acylation reaction termination, a neutralizing agent or its solution may be added for the purpose of hydrolysis of the excessive anhydrous carboxylic acid remaining in the system, neutralization of part or all of the carboxylic acid and esterification catalyst, adjustment of the amount of remaining sulfate radicals and the amount of remaining metal, and the like.

Preferred examples of the neutralizing agent may include carbonates, hydrogen carbonates, organic acid salts (for example, acetates, propionates, butyrates, benzoates, phthalates, hydrogen phthalates, citrates, tartrates, etc.), phosphates, hydroxides, or oxides of ammonium, organic quaternary ammonium (for example, tetramethylammonium, tetraethylammonium, tetrabutylammonium, diisopropyldiethylammonium, etc.), alkali metals (preferably lithium, sodium, potassium, rubidium, and cesium, even more preferably lithium, sodium, and potassium, and particularly preferably sodium and potassium), elements of Group 2 (preferably beryllium, calcium, magnesium, strontium, barium, beryllium, calcium, and magnesium, and particularly preferably calcium and magnesium), metals of Groups 3 to 12 (for example, iron, chromium, nickel, copper, lead, zinc, molybdenum, niobium, titanium, etc.), or elements of Groups 13 to 15 (for example, aluminum, tin, antimony, etc.), and the like. These neutralizing agents may be used in mixtures, or may form mixed salts (for example, magnesium acetate propionate or potassium sodium tartrate). In the case of when the anion of such neutralizing agent is divalent or higher, the agent may form hydrogen salts (for example, sodium hydrogen carbonate, potassium hydrogen carbonate, sodium dihydrogen phosphate, magnesium hydrogen phosphate, etc.).

More preferred examples of the neutralizing agent include carbonates, hydrogen carbonates, organic acid salts, hydroxides, or oxides of ammonium, alkali metals, elements of Group 2, or elements of Group 13, or the like, and particularly preferred examples include carbonate, hydrogen carbonate, acetate, or hydroxide of sodium, potassium, magnesium, or calcium.

Preferred examples of the solvent for the neutralizing agent may include water, alcohols (for example, ethanol, methanol, propanol, isopropyl alcohol, etc.), organic acids (for example, acetic acid, propionic acid, butyric acid, etc.), ketones (for example, acetone, ethyl methyl ketone, etc.), polar solvents such as dimethylsulfoxide, and solvent mixtures thereof.

(Partial Hydrolysis)

The cellulose acylate thusly purchased has a substitution degree for an acyl group of nearly 3, but for the purpose of obtaining cellulose acylate of desired substitution degree, a process of partially hydrolyzing the ester bonds by maintaining the cellulose acylate at 20 to 90° C. for a few minutes to a few days in the presence of a small amount of catalyst (generally an acylation catalyst such as remaining sulfate) and water, in order to reduce the substitution degree for an acyl group of the cellulose acylate to a desired degree (so-called aging) is usually carried out. The amount of the sulfuric acid ester bound to the cellulose can be reduced in the process of partial hydrolysis by also allowing hydrolysis of the sulfuric acid ester of cellulose, and by adjusting the conditions for hydrolysis.

(Termination of Partial Hydrolysis)

It is preferable to terminate the partial hydrolysis at the time point of obtaining the desired cellulose acylate by completely neutralizing the catalyst remaining in the system using a neutralizing agent or its solution as described above.

In the case of when a sulfuric acid is used as the catalyst, the amount of the neutralizing agent added to the reaction mixture is preferably an excessive equivalent amount with respect to the sulfate radicals (free sulfuric acid or cellulose-bound sulfuric acid). According to the aspect of the invention, the neutralizing agent may be added in portions, but it is desirable to add the neutralizing agent after completion of the partial hydrolysis (aging) so that the amount of the neutralizing agent is an excessive equivalent amount with respect to the sulfate radicals. The sulfuric acid bound to the cellulose (cellulose sulfate) is a monovalent acid, but the equivalent of the neutralizing agent is calculated in terms of free sulfuric acid. Thereby, the equivalent of the neutralizing agent may be determined from the amount of the sulfuric acid added. A preferred amount of the neutralizing agent to be added is preferably 1.2 to 50 equivalents, more preferably 1.3 to 20 equivalents, and particularly preferably 1.5 to 10 equivalents, with respect to sulfate radicals.

It is also desirable to effectively remove the catalyst (for example, sulfuric acid ester) in the solution or bound to the cellulose by adding a neutralizing agent which produces a salt of low solubility to the reaction solution (for example, magnesium carbonate, magnesium acetate, etc.).

(Post-Heating Process)

The reaction mixture after the termination of the partial hydrolysis is preferably further maintained at 30 to 100° C. for at least one hour (post-heating process). By carrying out this process, a cellulose acylate having good thermal stability may be purchased by reducing the amount of the sulfuric acid bound to cellulose acylate. As to the reason for the reduction of the amount of the sulfuric acid bound to cellulose acylate in this process, although details have not been clarified, it is believed that heating a cellulose acylate solution in the presence of base in excess leads to gradual de-esterification of the sulfuric acid ester which is more likely to undergo hydrolysis than acyl ester, and free sulfuric acid that is neutralized by the base drives the equilibrium to be lopsided to the production system and thus promotes the reaction.

For the post-heating process, the maintenance temperature is preferably 30 to 100° C., more preferably 40 to 100° C., even more preferably 50 to 90° C., and particularly preferably 60 to 80° C. When the temperature is set to 30° C. or more, the effect of reducing the amount of bound sulfuric acid is easily purchased, while when the temperature is set to 100° C. or less, the process is improved in the aspect of operability or safety. Additionally, for the post-heating process, the time for maintenance is preferably 1 to 100 hours, more preferably 2 to 100 hours, and particularly preferably 2 to 50 hours. When the time is set to 1 hour or more, the amount of bound sulfuric acid is efficiently reduced, while when the time is set to 100 hours or less, industrial productivity is improved. For the post-heating process, the reaction mixture is preferably stirred. Furthermore, the neutralizing agent may be further added during the post-heating process.

(Re-Precipitation)

The Desired Cellulose Acylate May be Purchased by mixing the cellulose acylate solution thusly purchased into a poor solvent such as water and/or an aqueous carboxylic acid solution (for example, acetic acid, propionic acid, butyric acid, etc.), or by mixing a poor solvent into the cellulose acylate solution to re-precipitate the cellulose acylate, and washing and stabilizing the purchased cellulose acylate. The re-precipitation may be carried out continuously or in a batch mode with definite amounts. It is also preferable to control the form or molecular weight distribution of the re-precipitated cellulose acylate by adjusting the concentration of the cellulose acylate solution and the composition of the poor solvent by means of the mode of substitution or degree of polymerization of the cellulose acylate.

Furthermore, for the purpose of purifying cellulose acylate by using a production method other than the method according to the aspect of the invention, improving the purification effect of cellulose acylate by using the production method according to the aspect of the invention, adjusting the molecular weight distribution or apparent density, or the like, the operation of conducting re-precipitation may be carried out once or several times, as needed, by re-dissolving the once re-precipitated cellulose acylate in a good solvent (for example, acetic acid, acetone, etc.), performing the filtration, and subjecting the solution to a poor solvent (for example, water, carboxylic acid (for example, acetic acid, propionic acid, butyric acid), etc.). In connection with this, it is preferable that the solvent and the poor solvent be filtered in advance to remove fine impurities therefrom.

(Washing)

The produced cellulose acylate is preferably subjected to washing. The washing solvent may be any one that has low dissolvability for cellulose acylate and is capable of removing impurities, but usually washing water such as water or warm water is used. The temperature of the washing water is preferably 20 to 100° C., more preferably 30 to 95° C., and particularly preferably 40 to 95° C. The temperature during the washing process may be constant or may vary within an arbitrary temperature range; however, the invention preferably comprises a step of washing the cellulose acylate at preferably 40 to 95° C., more preferably 50 to 95° C., and particularly preferably 60 to 90° C., for preferably 1 to 100 hours, more preferably 2 to 50 hours, and particularly preferably 3 to 10 hours. The above-described washing process at 40 to 95° C. and another washing process in another temperature range may be combined.

The washing treatment may be carried out in a so-called batch mode where alternation of filtration and washing liquid is repeated, or may be carried out using a continuous washing apparatus. It is preferable to reuse the waste water generated in the re-precipitation and washing processes as the poor solvent for the re-precipitation process, or to recover the solvent such as carboxylic acid by means of distillation or the like and reuse the solvent.

The course of washing may be traced by any means, but preferred examples may include methods involving hydrogen ion concentration, ion chromatography, electric conductivity, ICP, elemental analysis, atomic absorption spectrum, and the like.

Such treatment allows removal of the catalyst (a sulfuric acid, a perchloric acid, a trifluoroacetic acid, a p-toluenesulfonic acid, a methanesulfonic acid, zinc chloride, etc.) of cellulose acylate, the neutralizing agent (for example, carbonate, acetate, hydroxide, or oxide of calcium, magnesium, iron, aluminum, or zinc, etc.), the reaction product between the neutralizing agent and the catalyst, the carboxylic acid (acetic acid, propionic acid, butyric acid, etc.), the reaction product between the neutralizing agent and carboxylic acid, and the like, and thus is effective in enhancing the stability of the cellulose acylate.

(Stabilization)

It is also preferable to treat the cellulose acylate, after the washing by warm water treatment, with an aqueous solution of weak alkali (for example, carbonate, hydrogen carbonate, hydroxide, oxide, or the like of sodium, potassium, calcium, magnesium, aluminum, or the like), in order to further enhance the stability or to reduce the odor of the carboxylic acid. In this connection, it is preferable that the solution of the used stabilizer be filtered to remove contained fine impurities therefrom.

The amount of remaining impurities may be controlled by the metal content in the water used (the amount of metal ions contained in the water used as washing water or the like as trace components), the amount of the washing liquid, the washing temperature, time, agitation method, the form of the washing vessel, or the composition or concentration of the stabilizer. According to the aspect of the invention, the conditions for the acylation, partial hydrolysis, neutralization, and washing are preferably set such that the amount of remaining sulfate radicals (in terms of the content of sulfur atoms) is 50 to 500 ppm. The amount of remaining alkali metal and the amount of Group 2 element also may be adjusted by the conditions of partial hydrolysis, neutralization, and washing.

According to the aspect of the invention, preferably, a ratio (M/S) of a molar content (M) of alkali metals (potassium, sodium, etc.) and elements of Group 2 (magnesium, calcium, etc.) to a molar content (S) of remaining sulfate radicals that are contained in cellulose acylate is 0.5 to 3. Furthermore, it is preferable that a potassium content be 25 ppm or less and a sodium content be 25 ppm or less.

In the case of when the cellulose acylate satisfies the above-mentioned relation, thermal stability may be made good. The lower limits of contents of potassium and sodium are not limited.

(Drying)

In order to adjust the water content in the cellulose acylate to a preferred amount in the aspect of the invention, it is desirable to dry the cellulose acylate. The method of drying is not particularly limited as long as the desired water content can be purchased, but it is preferable to carry out the drying efficiently by using the means such as heating, blow drying, pressure reduction, and agitation individually or in combination. The drying temperature is preferably 0 to 200° C., more preferably 40 to 180° C., and particularly preferably 50 to 160° C. The cellulose acylate according to the aspect of the invention has a water content of preferably 2 wt % or less, more preferably 1 wt % or less, and particularly preferably 0.7 wt % or less.

(Filtration)

According to the aspect of the invention, the solution in which cellulose acylate that satisfies at least formulae 1 to 3 and has a melt viscosity of 150 to 1000 Pa·s at 230° C. is dissolved in the solvent is filtered by using a filter having a retention particle size of 0.1 to 40 μm. In addition to the filtration according to the aspect of the invention, the cellulose acylate may be filtered by using a reaction mixture (dope) in order to remove or reduce unreacted substances, insoluble salts, and other impurities from the cellulose acylate in cellulose during the production of the cellulose acylate. The filtration may be performed at any step between the acylation and the re-precipitation. Preferably, the filtration is performed immediately before the re-precipitation.

The retention particle diameter of the filter that is used to perform the filtration is preferably 0.1 to 50 μm, more preferably 0.5 to 40 μm, and particularly preferably 1 to 30 μm. If the retention particle diameter of the filter is set to 0.1 μm or more, since an increase in filtration pressure is not significant, industrial production thereof is apt to be easily achieved. Furthermore, the retention particle diameter of the filter may be set to 40 μm or less to easily remove the impurities. In addition, the filtration may be repeated twice or more.

The material of the filter is not limited as long as the material is not negatively affected by the solvent. Preferable examples of the material of the filter may include a cellulose-based filter, a metal filter, a sintered metal filter, a sintered ceramic filter, a Teflon filter (PTFE filter) (Teflon®), a polyethersulfone filter, a polypropylene filter, a polyethylene filter, a glass fiber filter, or a mixture thereof. Among them, the metal filter that is made of stainless steel and the sintered metal filter are preferable.

As to the type of the material of the filter, the filter having an electric charge capture ability may be preferably used. The filter having the electric charge capture ability means the filter that has an ability capable of capturing and removing the electrically charged impurities. Generally, in the filter, electric charges are provided to a filtration material. Examples of the filter may include filters that are disclosed in JP-T-1992-504379 and JP-A-2000-212226.

Preferably, a dead-end filtration process in which sellite, layered clay minerals (preferably, talc, mica, kaolinite, and the like), and the like are mixed with the cellulose acylate solution and the resulting mixture is filtered is used.

In order to control the filtration pressure or handlability, it is preferable to perform dilution using a suitable solvent before the filtration.

(Solvent)

According to the aspect of the invention, the solution in which cellulose acylate that satisfies at least formulae 1 to 3 and has a melt viscosity of 150 to 1000 Pa·s at 230° C. is dissolved in the solvent is filtered by using a filter having a retention particle size of 0.1 to 40 μm. Any solvent may be used in respect to the cellulose acylate as long as solubility of the cellulose acylate is high. Preferable examples of the solvent may include a carboxylic acid (formic acid, an acetic acid, a propionic acid, a butyric acid, and the like), ketone (aceton, ethyl methyl ketone, ethyl isobutyl ketone, and the like), ester (methyl acetate, ethyl acetate, acetic acid butyl, acetic acid isopropyl, and the like), a halogen-based solvent (dichloromethane, chloroform, dichloroethane, and the like), and the like. The above-mentioned solvents may be used singly or in a mixture form containing two or more solvents.

More preferable examples of the solvent include a carboxylic acid (an acetic acid, a propionic acid, a butyric acid, and the like), ketone (aceton, ethyl methyl ketone, ethyl isobutyl ketone, and the like), and the like. Particular preferable examples of the solvent include a carboxylic acid (an acetic acid, a propionic acid, and the like) and ketone (acetone and the like).

Preferable examples of the poor solvent that is used during the re-precipitation may include water, alcohols (methanol, ethanol, isopropyl alcohol, butanol, and the like), hydrocarbon-based solvents (pentane, hexane, heptane, toluene, and the like). The above-mentioned poor solvents may be used singly or in a mixture form containing two or more solvents. A mixture of the poor solvent and another solvent may be used without deviation from the scope of the invention.

More preferable examples of the poor solvent include water and alcohols (methanol, ethanol, isopropyl alcohol, and the like), and particular preferable examples of the poor solvent include water and alcohols (methanol and the like).

(Specific Procedure of the Filtration Process)

The retention particle diameter of the filter that is used to perform the filtration is preferably 1 to 30 μm, more preferably 1 to 20 μm, and particularly preferably 2 to 20 μm. The retention particle diameter of the filter is set to 0.1 μm or more to prevent filtration pressure from being significantly increased and to easily perform industrial production thereof. Furthermore, the retention particle diameter of the filter may be set to 40 μm or less to easily remove the impurities and to improve optical performance of the purchased film. In addition, the filtration may be repeated twice or more, and the filters having different retention particle sizes may be used in combination.

The filtration may be performed at any temperature as long as the filtration is capable of being performed. However, it is possible to reduce the viscosity of the solution when the filtration temperature is preferably 30 to 100° C., more preferably 35 to 80° C., and particularly preferably 40 to 70° C.

Furthermore, in respect to the filtration pressure, the filtration is performed at preferably 0.001 to 10 MPa, more preferably 0.001 to 5 MPa, and particularly preferably 0.01 to 1 MPa.

According the aspect of the invention, a solution where the carboxylic acid is added to the cellulose acylate may be filtered by using a filter having a retention particle size of 0.1 to 40 μm at any step between an early step of the acylation process and the re-precipitation process in order to efficiently remove or reduce unreacted substances, insoluble salts, and other impurities from the cellulose acylate in cellulose during the production of the cellulose acylate. The retention particle size may be purchased according to the method that is disclosed in JIS P 3801.

Particularly, according to the aspect of the invention, if the filtration is performed immediately before the repreicipitation process, this is preferable in views of stability of quality of products and a reduction in filtration viscosity. In the case of when the filtration is performed through two stages, it is preferable that rough filtration be performed by using a filter having a retention particle size of 20 to 40 μm and additional filtration be performed by using a filter having a retention particle size of 0.1 to 20 μm. Preliminary filtration may be performed by using a filter having a retention particle size of 40 to 100 μm before the filtration according to the aspect of the invention.

In the production method according to the aspect of the invention, the material of the filter is not limited as long as the material is not negatively affected by the solvent. Preferable examples of the material of the filter may include a cellulose-based filter, a metal filter, a sintered ceramic filter, a Teflon filter (PTFE filter), a polyethersulfone filter, a polypropylene filter, a polyethylene filter, a glass fiber filter, or a mixture thereof.

As to the type of the material of the filter, the filter having an electric charge capture ability may be preferably used. The filter having the electric charge capture ability means the filter that has an ability capable of capturing and removing the electrically charged impurities. Generally, in the filter, electric charges are provided to a filtration material. Examples of the filter may include filters that are disclosed in JP-T-1992-504379 and JP-A-2000-212226.

Preferably, a dead-end filtration process in which sellite, layered clay minerals (preferably, talc, mica, kaolinite, and the like, and more preferably talc), and the like are mixed with the cellulose acylate solution and the resulting mixture is filtered is used.

In order to control the filtration pressure or handlability, it is preferable to perform dilution using a suitable solvent before the filtration.

The filtration may be selected from pressure filtration, vacuum filtration, or normal pressure filtration, but it is preferable to perform the pressure filtration.

(Amount of Impurity)

The amount of impurity that is contained in a cellulose acylate composition according to the aspect of the invention and has a particle size of 40 μm or more is preferably 0.1 particles/g or less, more preferably 0.05 particles/g or less, and particularly preferably 0.01 particles/g or less.

The amount of the impurity may be measured by using a microscope and a light scattering type of particle detector. The shape of impurity is generally a needle or a particle, but is not limited thereto. In the aspect of the invention, in respect to the amount of impurity, the impurity contains unreacted cellulose, impurity added from the outside, gellated substances, and side products which are not compatible with the cellulose acylate.

(Degree of Polymerization)

The molecular weight of the cellulose acylate that is used in the aspect of the invention is a weight average molecular weight which is purchased by using a gel permeation chromatography method (GPC method) and 80,000 to 180,000. The weight average molecular weight is preferably 90,000 to 190,000, and more preferably 100,000 to 180,000.

If the weight average molecular weight is set to 180,000 or less, since the melt viscosity is not significantly high, the casting is apt to be easily performed. Meanwhile, if the weight average molecular weight is set to 80,000 or more, since the melt viscosity is not significantly reduced while the required strength of the film is maintained, the cutting may be desirably performed during the kneading. Accordingly, this is preferable because the kneading is desirably performed.

The average molecular weight may be measured by the intrinsic viscosity method of Uda et al. (Kazuo Uda and Hideo Saito: Journal of the Society of Fiber Science and Technology, Japan, Vol. 18, No. 1, pp. 105-120, 1962), in addition to the molecular weight distribution measurement by GPC, or the like. These are described in detail in JP-A-1997-95538.

According to the aspect of the invention, the weight average molecular weight/number average molecular weight of the cellulose acylate is preferably 1.0 to 5, more preferably 1.3 to 4, and particularly preferably 1.5 to 3.5.

The average substitution degree for the substituent according to the aspect of the invention may be determined by $^1$H-NMR or $^{13}$C-NMR.

According to the aspect of the invention, two or more different types of cellulose acylates may be used in a mixture or separately.

(Form)

In the production method according to the aspect of the invention, the solution, the melt, the gel, the pellet, or the film is preferable, and the pellet or the film is more preferable.

The pellet can be in various forms such as particulate form, powdered form, fiber form, lump form, or the like.

However, since the particulate form or powdered form is preferable for the raw material for cellulose acylate film production, the dried cellulose acylate composition may be pulverized or sieved for the purpose of uniformizing the particle size or improving the handlability. When the cellulose acylate composition is in the particulate form, 90 wt % or greater of the particles used preferably have a particle size of 0.5 to 5 mm. Also, 50 wt % or greater of the particles used preferably have a particle size of 1 to 4 mm. The cellulose acylate composition particles preferably have a shape proximate to the spherical shape as much as possible. Furthermore, the cellulose acylate composition that is produced by using the production method according to the aspect of the invention preferably has an apparent density of 0.5 to 1.3 g/cm$^3$, more preferably 0.7 to 1.2 g/cm$^3$, and particularly preferably 0.8 to 1.15 g/cm$^3$. The method for measuring the apparent density is provided in JIS K-7365.

The cellulose acylate composition that is purchased by the production method according to the aspect of the invention has an angle of repose of preferably 10 to 70°, more preferably 15 to 60°, and particularly preferably 20 to 50°.

<Optical Properties of the Cellulose Acylate Film>

Next, the cellulose acylate film that is produced by the production method according to the aspect of the invention will be described. Preferably, the cellulose acylate film that is produced by the production method according to the aspect of the invention satisfies the following formulae i and ii.

$$-500 \text{ nm} \leq Re \leq 500 \text{ nm} \quad \text{Formula i}$$

$$-500 \text{ nm} \leq Rth \leq 500 \text{ nm} \quad \text{Formula ii}$$

Re is more preferably −100 to 250 nm and particularly preferably 0 to 150 nm. Rth is more preferably −200 to 400 nm and particularly preferably −100 to 300 nm.

[Retardation]

First, in the aspect of the invention, the retardation will be described. In this specification, Re and Rth (unit; nm) are measured by using the following method. After the film is subjected to humidity conditioning at 25° C. and a relative humidity of 60% for 24 hours, an average refractive index (n) that is represented by the following Formula a is purchased by means of a prism coupler (MODEL 2010 Prism Coupler: manufactured by Metricon, Co.) using a solid laser of 532 nm at 25° C. and a relative humidity of 60%.

$$n=(nTE \times 2+nTM)/3 \quad \text{Formula a}$$

wherein, nTE is a refractive index measured by in-plane polarized light of the film and nTM is a refractive index measured by polarized light in a direction perpendicular to the film surface.

According to this specification, Re (λ) and Rth (λ) represent the in-plane retardation and the retardation in the thickness direction, respectively, at a wavelength of λ. Re (λ) is measured using KOBRA 21ADH or WR (manufactured by Oji Scientific Instruments, Ltd.), by radiating light at a wavelength of λ nm incidentally to the direction normal to the film.

In the case of when the film to be measured is represented as a uniaxial or biaxial optical indicatrix, Rth (λ) is calculated by the following method.

For Rth (λ), the above-described Re (λ) is measured at eleven points by taking the in-plane retardation axis (determined by KOBRA 21ADH or WR) as the tilting axis (rotating axis) (when there is no retardation axis, an arbitrary direction in the film plane is taken as the rotating axis), and radiating light at a wavelength of λ nm incidentally to the film normal direction, from the respective tilting directions selected in an interval of 10° in the range from the normal direction to +50° on either side, and Rth (λ) is calculated based on the measured retardation values, assumed values for the average refractive indices, and the input film thickness, by using KOBRA 21ADH or WR.

In this connection, in the case of when a description is not given of λ but only "Re" and "Rth" are described, the value that is measured by using light at a wavelength of 590 nm is given. In this regard, in the case of a film having a direction in which the retardation value would be zero at a certain tilting angle in the range of from the normal direction to the in-plane retardation axis as the rotating axis, it is calculated by KOBRA 21ADH or WR, after changing the symbol of the retardation value at a tilting angle larger than the above-mentioned tilting angle, to negative.

Furthermore, Rth may be measured from any two tilting directions, while taking the retardation axis as the tilting axis (rotating axis) (when there is no retardation axis, any direction in the film plane is taken as the rotating axis), based on the values, an assumed value for the average refractive index, and the input film thickness, according to the following Formula b and Formula c.

$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad \text{Formula b}$$

wherein, Re(θ) represents the retardation value in a direction tilting from the normal direction at an angle of θ. nx represents the refractive index in the in-plane retardation axis, ny represents the refractive index in a direction perpendicular to the in-plane nx, and nz represents the refractive index in a direction perpendicular to nx and ny.

$$Rth=((nx+ny)/2-nz) \times d \quad \text{Formula c}$$

In the case of when a film to be measured cannot be represented as a uniaxial or biaxial optical indicatrix, that is, in the case of when the film does not have so-called an optic axis, Rth (λ) is calculated by the following method.

For Rth (λ), the above-mentioned Re (λ) is measured at 11 points by taking the in-plane retardation axis (determined by KOBRA 21ADH or WR) as the tilting axis (rotating axis) (when there is no retardation axis, an arbitrary direction in the film plane is taken as the rotating axis), and radiating a light at a wavelength of λ nm incidentally to the film normal direction, from the respective tilting directions selected in an interval of 10° in the range from −50° to +50° with respective to the film normal direction, and Rth (λ) is calculated based on the measured retardation values, assumed values for the average refractive indices, and the input film thickness, by using KOBRA 21ADH or WR.

When these assumed values of average refractive indices and film thicknesses are input, nx, ny, and nz are calculated by using the KOBRA 21ADH or WR. Nz=(nx−nz)/(nx−ny) is calculated by using these calculated nx, ny, and nz.

The method for producing the cellulose acylate film according to the aspect of the invention is not limited, but it is preferable that the production be performed by using the following melt casting method or solution casting method. Since a load to filtration that is performed during the casting process is significantly reduced, it is more preferable to perform the casting by using the melt casting.

<Melt Casting>

In the aspect of the invention, the cellulose acylate film can be produced by using the melt casting method.

In the aspect of the invention, the cellulose acylate may be used singly or as a mixture containing two or more thereof. Furthermore, polymer components other than the cellulose acylate used in the aspect of the invention, or various types of additives may be appropriately added. It is preferable to add the components that have excellent compatibility to the cellulose acylate. Permeability of the resulting film is preferably 80% or more, more preferably 90% or more, and particularly preferably 92% or more.

The melt viscosity of the cellulose acylate composition that is applied to the melt casting at 230° C. (the melt viscosity of the produced cellulose acylate film at 220° C.) is 150 to 1000 Pa·s. The above-mentioned melt viscosity can be purchased when the compositions of the substituents satisfy formulae 1 to 3 and their molecular weights are controlled.

(Stabilizer)

In the aspect of the invention, it is desirable to add a stabilizer in order to maintain stability of the cellulose acylate during the high temperature melt casting. Particularly, it is preferable to add at least one phenol-based stabilizer having a molecular weight of 500 or more and at least one of a phosphorous acid ester-based stabilizer and a thioether-based stabilizer having a molecular weight of 500 or more. A known phenol-based stabilizer may be used as a preferable phenol-based stabilizer. Preferable examples of the phenol-based stabilizer may include a hindered phenol-based stabilizer. Particularly, it is preferable that the phenol-based stabilizer have a substituent adjacent to a phenol-based hydroxyl group. In this case, a substituted or unsubstituted alkyl group having 1 to 22 carbon atoms is preferable as the substituent, and a methyl group, an ethyl group, a propionyl group, an isopropionyl group, a butyl group, an isobutyl group, a tert-butyl group, a pentyl group, an isopentyl group, a tert-pentyl group, a hexyl group, an octyl group, an isooctyl group, and a 2-ethylhexyl group are more preferable. In addition, preferable examples of material may include a stabilizer that has a phenol group and a phosphorous acid ester group in the same molecule.

The stabilizer can be commercially purchased and is sold by the following makers. Irganox 1076, Irganox 1010, Irganox 3113, Irganox 245, Irganox 1135, Irganox 1330, Irganox 259, Irganox 565, Irganox 1035, Irganox 1098, and Irganox 1425WL can be purchased from Ciba Specialty Chemicals, Inc. Furthermore, ADK STAB AO-50, ADK STAB AO-60, ADK STAB AO-20, ADK STAB AO-70, and ADK STAB AO-80 can be purchased from ADEKA CORPORATION. Furthermore, sumilizer BP-76, sumilizer BP-101, and sumilizer GA-80 can be purchased from Sumitomo Chemical Co., Ltd. Furthermore, SEENOX 326M and SEENOX 336B can be purchased from SHIPROKASEI KAISYA, Ltd.

Furthermore, it is preferable to contain a phosphorous acid ester-based stabilizer that has a molecular weight of 500 or more and an oxidation prevent effect. Examples of these compounds may include compounds disclosed in paragraph Nos. [0023] to [0039] of JP-A-2004-182979 and mixtures disclosed in JP-A-1976-70316, JP-A-1998-306175, JP-A-1982-78431, JP-A-1979-157159, and JP-A-1980-13765. Other stabilizers may be selected from materials disclosed in detail in pages 17 to 22 of the Journal of Technical Disclosure of Japan Institute of Invention and Innovation (Article No. 2001-1745, published on Mar. 15, 2001, Japan Institute of Invention and Innovation). As to examples thereof, ADK STAB 1178, ADK STAB 2112, ADK STAB PEP-8, ADK STAB PEP-24G, PEP-36G, and ADK STAB HP-10 of ADEKA CORPORATION, and Sandostab P-EPQ of Clariant, Co. are placed on the market and can be purchased. As to a thioether stabilizer, a known thioether-based stabilizer may be used. Sumilizer TPL, sumilizer TPM, sumilizer TPS, and sumilizer TDP of Sumitomo Chemical Co., Ltd are placed on the market as the thioether stabilizer. ADK STAB AO-412S of ADEKA CORPORATION is capable of being purchased. In the case of when these stabilizers are used, it is preferable that at least one of phenol-based stabilizers and at least one of a phosphorous acid ester-based stabilizer and a thioether-based stabilizer be each contained in an amount of 0.02 to 3% by mass in respect to cellulose acylate. Particularly, it is preferable that the amount be 0.05 to 1% by mass. The ratio of amounts of the phenol-based stabilizer and the phosphorous acid ester-based stabilizer or the thioether-based stabilizer is not limited, but preferably 1/10 to 10/1 (parts by mass), more preferably 1/5 to 5/1 (parts by mass), even more preferably 1/3 to 3/1 (parts by mass), and particularly preferably 1/3 to 2/1 (parts by mass).

According to the aspect of the invention, the stabilizer that has a phenol group and a phosphorous acid ester group in the same molecule is used. These materials are disclosed in JP-A-1998-273494. Sumilizer GP (Sumitomo Chemical Co., Ltd) may be used as commercial products. Furthermore, long-chain aliphatic amine that is disclosed in JP-A-1986-63686, a compound containing a steric barrier amine group that is disclosed in JP-A-1994-329830, a hindered piperidinyl-based light stabilizer that is disclosed in JP-A-1995-90270, and an organic amine that is disclosed in JP-A-1995-278164 may be used. ADK STAB LA-57, ADK STAB LA-52, ADK STAB LA-67, ADK STAB LA-62, and ADK STAB LA-77 of ADEKA CORPORATION and TINUVIN 765 and TINUVIN 144 of Ciba Specialty Chemicals Inc. are placed on the market as the preferable amine-based stabilizer. The ratio of amines to phosphorous acid esters is generally 0.01 to 25% by mass.

(Plasticizer)

If a plasticizer is added to cellulose acylate during the casting, the crystal melt temperature (Tm) of the cellulose acylate may be reduced. The molecular weight of the plasticizer that is used in the aspect of the invention is not limited, but preferably 500 or more, more preferably 550 or more, and particularly preferably 600 or more which is high.

Examples of the plasticizer may include phosphoric acid esters, alkylphthalylalkyl glycolates, carboxylic acid esters, fatty acid esters of polyhydric alcohol, and the like. The plasticizer may be in a solid form or oily form. That is, the melting point or boiling point thereof is not limited. In the case of when the melt casting is performed, it is particularly preferable to use the matter having nonvolatility.

Examples of the phosphoric acid ester may include triphenyl phosphate, tricresyl phosphate, phenyl diphenyl phosphate, and the like.

Examples of the alkylphthalylalkyl glycolates may include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate, and the like.

Examples of the carboxylic acid esters may include phthalic acid esters such as dimethyl phthalate, diethyl phthalate, dibutyl phthalate, dioctyl phthalate, and diethylhexyl phthalate, and citric acid esters such as acetyltrimethyl citrate, acetyltriethyl citrate, and acetyltributyl citrate. In addition to these, it is favorable to use butyl oleate, methylacetyl linolate, dibutyl sebacate, triacetin and the like individually or in combination.

The amount of these plasticizers is preferably 0 to 15% by mass, more preferably 0 to 10% by mass, and particularly preferably 0 to 8% by mass, with respect to the cellulose acylate composition. These plasticizers may be used in combination of two or more species, if necessary.

(Stabilizer)

According to the aspect of the invention, it is preferable to add at least one of stabilizers to the material constituting the film before or during the melting of the cellulose acylate by heating. These are useful to prevent oxidation of the material constituting the film, capture of acids generated due to the decomposition, suppress or prevent the decomposition reaction due to radical species by light or heat, and suppress the decomposition reaction that is not explained and the generation of volatile components due to deterioration such as coloring or a reduction in molecular weight or decomposition of the material. In respect to the melt temperature for casting, it is required that the stabilizer is not decomposed. The stabilizer may be appropriately selected according to the purpose.

Examples of the material of the stabilizer may include a phenol-based stabilizer, a phosphorous acid-based stabilizer (phosphates), a thioether-based stabilizer, an amine-based stabilizer, an epoxy-based stabilizer, a lactone-based stabilizer, an amine-based stabilizer, a metal deactivating agent (tin-based stabilizer), and the like. These are disclosed in JP-A-1991-199201, JP-A-1993-1907073, JP-A-1993-194789, JP-A-1993-271471, JP-A-1994-107854, and the like.

According to the aspect of the invention, the stabilizer may be used singly or in combination of two or more species, and the mixing amount is appropriately selected within the range where an advantage of the invention is not obstructed. The amount of stabilizer added is preferably 0.001 to 5% by mass, more preferably 0.005 to 3% by mass, and particularly preferably 0.01 to 0.8% by mass based on the mass of the cellulose resin.

(Phenol-Based Stabilizer)

According to the aspect of the invention, the hindered phenol-based stabilizer that is useful as the compound used to perform stabilization in the course of melting the material constituting the film by heating is a known compound, for example, a 2,6-dialkylphenol derivative compound that is disclosed in paragraphs 12 to 14 of U.S. Pat. No. 4,839,405.

Among them, it is particularly preferable to add the phenol-based stabilizer having the molecular weight of 500 or more.

Preferable examples of the phenol-based stabilizer may include a hindered phenol-based stabilizer.

These materials are commercial products, capable of being easily purchased, and sold by the following makers. Irganox 1076, Irganox 1010, Irganox 3113, Irganox 245, Irganox 1135, Irganox 1330, Irganox 259, Irganox 565, Irganox 1035, Irganox 1098, and Irganox 1425WL of Ciba Specialty Chemicals, Inc. are capable of being purchased. Furthermore, ADK STAB AO-50, ADK STAB AO-60, ADK STAB AO-20, ADK STAB AO-70, and ADK STAB AO-80 of ADEKA CORPORATION are capable of being purchased. Furthermore, sumilizer BP-76, sumilizer BP-101, and sumilizer GA-80 of Sumitomo Chemical Co., Ltd are capable of being purchased. Furthermore, SEENOX326M and SEENOX336B of SHIPROKASEI KAISYA, Ltd. are capable of being purchased.

(Phosphorous Acid-Based Stabilizer)

The phosphorous acid ester-based stabilizer according to the aspect of the invention has a high molecular weight in order to maintain stability at high temperatures, and the molecular weight thereof is preferably 500 or more, more preferably 550 or more, and particularly preferably 600 or more. In addition, it is preferable that at least one substituent be an aromatic ester group. Furthermore, the phosphorous acid ester-based stabilizer is preferably trimester, and it is preferable that impurities such as a phosphoric acid, monoester, or diester are not mixed therewith. In the case of when the impurity is present, the amount is preferably 5% by mass or less, more preferably 3% by mass or less, and particularly preferably 2% by mass or less. Examples of them may include compounds that are disclosed in paragraphs [0023] to [0039] of JP-A-2004-182979, and compounds that are disclosed in JP-A-1976-70316, JP-A-1998-306175, JP-A-1982-78431, JP-A-1979-157159, and JP-A-1980-13765. Specific examples of the phosphorous acid ester-based stabilizer may include compounds as described below, but the phosphorous acid ester-based stabilizer capable of being used in the aspect of the invention is not limited thereto.

It is more preferable that compounds disclosed in paragraphs [0023] to [0039] of JP-A-2004-182979 be used as the phosphorous acid-based stabilizer. Specific examples of the phosphorous acid ester-based stabilizer may include compounds disclosed in JP-A-1976-70316, JP-A-1998-306175, JP-A-1982-78431, JP-A-1979-157159, and JP-A-1980-13765. Other stabilizers may be preferably selected from materials disclosed in detail in pages 17 to 22 of the Journal of Technical Disclosure of Japan Institute of Invention and Innovation (Article No. 2001-1745, published on Mar. 15, 2001, Japan Institute of Invention and Innovation).

As to examples thereof, ADK STAB 1178, ADK STAB 2112, ADK STAB PEP-8, ADK STAB PEP-24G, PEP-36G, and ADK STAB HP-10 of ADEKA CORPORATION, and Sandostab P-EPQ of Clariant, Co. are placed on the market and can be purchased. Additionally, it is preferable to use the stabilizer having phenol and phosphorous acid ester in the same molecule. These compounds and examples thereof are disclosed in detail in JP-A-1998-273494, but the stabilizer capable of being used in the aspect of the invention is not limited thereto. Examples of representative products that are placed on the market may include sumilizer GP of Sumitomo Chemical Co., Ltd.

(Thioether-Based Stabilizer)

The thioether-based stabilizer that is used as the stabilizer will be described. According to the aspect of the invention, the thioether-based stabilizer capable of being added to the cellulose acylate preferably has a molecular weight of 500 or more, and a known thioether-based stabilizer may be used.

Sumilizer TPL, sumilizer TPM, sumilizer TPS, and sumilizer TDP of Sumitomo Chemical Co., Ltd are placed on the market as the thioether stabilizer. ADK STAB AO-412S of ADEKA CORPORATION is capable of being purchased.

(Epoxy-Based Stabilizer)

It is preferable that the epoxy-based stabilizer contains an epoxy compound acting as an acid capture agent and disclosed in U.S. Pat. No. 4,137,201. The epoxy compound which acts as the acid capture agent is an epoxy compound known in the related art, and examples thereof may include epoxized vegetable oils and other unsaturated natural oils (these are usually called epoxized natural glyceride or unsaturated fatty acid, and these fatty acids generally contain 12 to 22 carbon atoms) that are represented by compositions such as diglycidylethers of various polyglycols, particularly polyglycols that are derived by condensation of about 8 to 40 mole of ethylene oxide per 1 mole of polyglycol, diglycidylethers of glycerol, metal epoxy compounds (for example, the matter that has been used in conjunction with a vinyl chloride polymer composition in a vinyl chloride polymer composition), epoxized ether condensates, diglycidylethers of bisphenol A (that is, 4,4'-dihydroxydiphenyldimethylmethane), epoxized unsaturated fatty acid esters (particularly, fatty acid having 2 to 22 carbon atoms, alkyl esters having 4 to 2 carbon atoms (for example, butyl epoxy stearates)), and various epoxized long-chain fatty acid triglycerides (for example, epoxized soybean oil). Particularly preferable is an epoxide resin compound placed on the market that contains an epoxy group, that is, EPON 815c, or an epoxized ether oligomer condensate product.

A compound that has an aliphatic, aromatic, alicyclic, araliphatic, or heterocyclic structure and an epoxy group as a side chain is useful as the epoxy-based stabilizer according to the aspect of the invention. The epoxy group is preferably bonded to a residue of the molecule through ether or ester bonding using a glycidyl group, or is an N-glycidyl derivative of heterocyclic amine, amide, or imide. These epoxy compounds are extensively known, and capable of being easily purchased as products placed on the market. The materials of them are disclosed in detail in paragraphs [0096] to [0112] of JP-A-1999-189706.

More preferable is ET-4) epoxized linoleic acid octyl, ET-6) an epoxized recinoleic acid octyl, ET-7) epoxized soybean oil fatty acid octyl, ET-8) epoxized soybean oil, and ET-9) epoxized flaxseed oil, and particularly preferably is ET-8) epoxized soybean oil or ET-9) epoxized flaxseed oil. Examples of these epoxy-based materials may include ADK STAB O-130P and ADK STAB O-180A (ADEKA CORPORATION), and the materials are capable of being purchased as products placed on the market.

(Tin-Based Stabilizer)

A known tin-based stabilizer may be used as the tin-based stabilizer. Specific examples of the tin-based stabilizer may include an octyl tin maleate polymer, monostearyl tin tris (isooctyl thioglycolate), and dibutyl tin dilaurate.

(Acid Capture Agent)

Since cellulose acylate is decomposed by acids at high temperatures, it is preferable that the optical film according to the aspect of the invention contain the acid capture agent.

According to the aspect of the invention, any compound may be used as a useful acid capture agent as long as the compound is reacted with acids to deactivate the acids. In connection with this, it is preferable that the compound has an epoxy group disclosed in U.S. Pat. No. 4,137,201. The epoxy compound which acts as the acid capture agent is an epoxy compound known in the related art, and examples thereof may include epoxized vegetable oils and other unsaturated natural oils (these are usually called epoxized natural glyceride or unsaturated fatty acid, and these fatty acids generally contain 12 to 22 carbon atoms) that are represented by compositions such as diglycidylethers of various polyglycols, particularly polyglycols that are derived by condensation of about 8 to 40 mole of ethylene oxide per 1 mole of polyglycol, diglycidylethers of glycerol, metal epoxy compounds (for example, the matter that has been used in conjunction with a vinyl chloride polymer composition in a vinyl chloride polymer composition), epoxized ether condensates, diglycidylethers of bisphenol A (that is, 4,4'-dihydroxydiphenyldimethylmethane), epoxized unsaturated fatty acid esters (particularly, epoxized unsaturated fatty acid having 2 to 22 carbon atoms, alkyl esters having 2 to 4 carbon atoms (for example, butyl epoxy stearates)), and various epoxized long-chain fatty acid triglycerides (for example, epoxized soybean oil). Furthermore, it is preferable to use EPON 815c as an epoxide resin compound placed on the market that contains an epoxy group.

Examples of the acid capture agent that is capable of being used in addition to the above-mentioned matters include oxetane compounds, oxazoline compounds, organic acid salts of alkaline earth metal, acetylacetonate complexes, and the matter disclosed in paragraphs 0068 to 0105 of JP-A-1993-194788.

The acid capture agent is called an acid elimination agent, an acid capture agent, an acid catcher, or the like, but there is no difference therebetween in the aspect of the invention.

The acid capture agent of the material for forming the film used in the aspect of the invention may be one or more selected from the above-mentioned examples, the addition amount of light stabilizer is preferably 0.001 to 5% by mass, more preferably 0.005 to 3% by mass, and particularly preferably 0.01 to 2% by mass based on the mass of the cellulose acylate.

(Ultraviolet Absorbing Agent)

It is preferable that one or more ultraviolet absorbing agents be contained in cellulose-mixed ester according to the aspect of the invention. It is preferable that the ultraviolet absorbing agent have an excellent ultraviolet absorbing ability at a wavelength of 380 nm or less in views of deterioration prevention for liquid crystals and absorb a small quantity of visible rays at a wavelength of 400 nm or more in views of liquid crystal display property. Examples of the ultraviolet absorbing agent may include an oxybenzophenone-based compound, a benzotriazole-based compound, a salicylic acid ester-based compound, a benzophenone-based compound, a cyanoacrylate-based compound, a nickel complex-based compound, and the like. Particularly preferable examples of the ultraviolet absorbing agent include the benzotriazole-based compound or the benzophenone-based compound. Among them, the benzotriazole-based compound is preferable because of small unnecessary coloring in respect to the cellulose-mixed ester. These are disclosed in JP-A-1985-235852, JP-A-1991-199201, JP-A-1993-1907073, JP-A-1993-194789, JP-A-1993-271471, JP-A-1994-107854, JP-A-1994-118233, JP-A-1994-148430, JP-A-1995-11056, JP-A-1995-11055, JP-A-1995-11056, JP-A-1996-29619, JP-A-1996-239509, and JP-A-2000-204173. The addition amount is preferably 0.01 to 2% by mass of prepared melts and more preferably 0.01 to 1.5% by mass.

Additionally, a polymer ultraviolet absorbing agent that is disclosed in JP-A-1994-148430 or a polymer containing ultraviolet absorbing agent monomers may be used as the polymer ultraviolet absorbing agent that is available to the aspect of the invention without any limitation. The weight average molecular weight of the polymer that is derived from the ultraviolet absorbing monomers is preferably 2,000 to 30,000, and more preferably 5,000 to 20,000. The amount of the ultraviolet absorbing monomers in the polymer that is derived from the ultraviolet absorbing monomers is preferably 1 to 70% by mass, and more preferably 5 to 60% by mass.

Examples of the ultraviolet absorbing agent monomer as the product available to the aspect of the invention include 1-(2-benzotriazole)-2-hydroxy-5-(2-vinyloxycarbonylethyl)benzene, 1-(2-benzotriazole)-2-hydroxy-5-(2-methacryroyloxyethyl)benzene of reactive ultraviolet absorbing agent RUVA-93 that is the product manufactured by Otsuka Chemical Holding Co., Ltd., or similar compounds thereof. Preferably, a homopolymer, a copolymerized polymer, or a copolymer thereof may be used, but the aspect of the invention is not limited thereto. For example, PUVA-30M that is manufactured by Otsuka Chemical Holding Co., Ltd. is preferably used as a polymer ultraviolet absorbing agent which is the product placed on the market. The ultraviolet absorbing agents may be used in combination of two or more species thereof.

The following products placed on the market may be used as the ultraviolet absorbing agent. Examples of benzotriazoles include TINUBIN P (products manufactured by Ciba Specialty Chemicals, Inc.), TINUBIN 234 (products manufactured by Ciba Specialty Chemicals, Inc.), TINUBIN 320 (products manufactured by Ciba Specialty Chemicals, Inc.), TINUBIN 326 (products manufactured by Ciba Specialty Chemicals, Inc.), TINUBIN 327 (products manufactured by Ciba Specialty Chemicals, Inc.), TINUBIN 328 (products manufactured by Ciba Specialty Chemicals, Inc.), sumisorb 340 (products manufactured by Sumitomo Chemical Co., Ltd), and ADK STAB LA-31 (ADEKA CORPORATION). Furthermore, examples of the benzophenone-based ultraviolet absorbing agent may include seesorb100 (products manufactured by SHIPROKASEI KAISYA, Ltd.), seesorb101 (products manufactured by SHIPROKASEI KAISYA, Ltd.), seesorb101S (products manufactured by SHIPROKASEI KAISYA, Ltd.), seesorb102 (products manufactured by SHIPROKASEI KAISYA, Ltd.), seesorb103 (products manufactured by SHIPROKASEI KAISYA, Ltd.), ADK STAB LA-51 (products manufactured by ADEKA CORPORATION), chemisorb111 (products manufactured by Chemipro Kasei Kaisha, Ltd.), UVINUL D-49 (products manufactured by BASF, Co), and the like. Furthermore, examples of the oxalic acid anilide-based ultraviolet absorbing agent include TINUBIN 312 (products manufactured by Ciba Specialty Chemicals, Inc.) or TINUBIN 315 (products manufactured by Ciba Specialty Chemicals, Inc.). Furthermore, examples of the salicylic acid-based ultraviolet absorbing agent include seesorb 201 (products manufactured by SHIPROKASEI KAISYA, Ltd.) or seesorb 202 (products manufactured by SHIPROKASEI KAISYA, Ltd.) as products placed on the market, and examples of the cyanoacrylate-based ultraviolet absorbing agent include seesorb 501 (products manufactured by SHIPROKASEI KAISYA, Ltd.) and UVINUL N-539 (products manufactured by BASF, Co.). Among them, particularly preferable is ADK STAB LA-31.

The addition amount of the ultraviolet absorbing agent and the ultraviolet absorbing polymer that are available to the aspect of the invention depends on the type of compound and use conditions. However, in the case of the ultraviolet absorbing agent, the amount is preferably 0.2 to 3.0 g per 1 $m^2$ of optical film, more preferably 0.4 to 2.0 g per 1 $m^2$ of optical film, and particularly preferably 0.5 to 1.5 g per 1 $m^2$ of optical film. Furthermore, in the case of the ultraviolet absorbing polymer, the amount is preferably 0.6 to 9.0 g per 1 $m^2$ of optical film, more preferably 1.2 to 6.0 g per 1 $m^2$ of optical film, and particularly preferably 1.5 to 3.0 g per 1 $m^2$ of optical film.

(Hindered Amine Light Stabilizer)

Examples of the light stabilizer include the hindered amine light stabilizer (HALS) compound which is a known compound, and examples of the hindered amine light stabilizer include 2,2,6,6-tetraalkyl piperidine compound, acid addition salts thereof, or complexes of them and metal compounds that are disclosed in paragraphs 5 to 11 of U.S. Pat. No. 4,619,956 and paragraphs 3 to 5 of U.S. Pat. No. 4,839,405. These are placed on the market as ADK STAB LA-57, ADK STAB LA-52, ADK STAB LA-67, ADK STAB LA-62, and ADK STAB LA-77 of ADEKA CORPORATION, and TINUVIN 765 and TINUVIN 144 of Ciba Specialty Chemicals, Inc.

The hindered amine-based light resistant stabilizer may be used singly or in combination of two or more species thereof. Furthermore, the hindered amine-based light resistant stabilizer may be used in conjunction with additives such as plasticizers, acid elimination agents, and ultraviolet absorbing agents, or provided into a portion of a molecular structure of each of the additives. The amount of additives is appropriately selected within the range where an advantage of the invention is not obstructed, but is preferably 0.01 to 20 parts by mass, more preferably 0.02 to 15 parts by mass, and particularly preferably 0.05 to 10 parts by mass based on 100 parts by mass of the cellulose resin that is used in the aspect of the invention. These may be added at any step of the production process of melts, and the additives may be added at the last step of the production process of melts.

In addition to the above-mentioned additives, various additives (for example, an optical anisotropy controlling agent, microparticles, an infrared absorbing agent, a surfactant, an odor trapping agent (amines, etc.), a thermal stabilizer, and the like) may be also added. For the infrared absorbing dye, for example, matters described in JP-A-2001-194522 may be used. For the ultraviolet absorbing agent, for example, matters described in JP-A-2001-151901 may be used. Each of them is preferably contained in an amount of 0.001 to 5% by mass with respect to the cellulose acylate. Microparticles preferably have an average particle size of 5 to 3000 nm, and may be formed of metal oxides or crosslinked polymers. The microparticles are preferably contained in an amount of 0.001 to 5% by mass with respect to the cellulose acylate. The deterioration preventing agent is preferably contained in an amount of 0.0001 to 2% by mass with respect to the cellulose acylate. The optical anisotropy controlling agent may be exemplified by matters described in JP-A-2003-66230 and JP-A-2002-49128, and is preferably contained in an amount of 0.1 to 15% by mass with respect to the cellulose acylate.

(Pelletization)

The cellulose acylate and the additives are preferably mixed with each other to be pelletized before the melt casting.

The cellulose acylate and the additives are melted at 150 to 250° C. by using a twin screw or uniscrew kneading extruder and extruded to form noodles, and the noodles are solidified in water and cut to perform the pelletization. The pelletization may be performed by using an underwater cut method in which extrusion and cutting are carried out in water. It is more preferable that the pelletization be performed while pressure is reduced by using a vent type kneading extruder. Furthermore, it is more preferable that the pelletization be performed while the inside of the kneading extruder is substituted by nitrogen.

As to the size of the preferable pellet, the sectional area is 1 to 300 mm$^2$ and the length is 1 to 30 mm. More preferably, the sectional area is 2 to 100 mm$^2$ and the length is 1.5 to 10 mm.

The number of rotations of the extruder is preferably 10 to 1000 rpm, and more preferably 30 to 500 rpm. The extrusion retention time of the pelletization is preferably 10 sec to 30 min and more preferably 30 sec to 3 min.

(Specific Procedure of Melt Casting Method)

Hereinafter, the specific procedure of the melt casting method will be described.

(1) Drying

Prior to the melt casting, the pellets are dried to remove water therefrom, and the water content is adjusted to 0.1% by mass or less and more preferably 0.01% by mass or less.

In order to achieve this, the drying temperature is preferably 40 to 180° C., and the drying wind rate is preferably 20 to 400 m$^3$/hour and more preferably 100 to 250 m$^3$/hour. The dew point of the drying wind is preferably 0 to −60° C. and more preferably −20 to −40° C.

(2) Melt Extrusion

The dried cellulose acylate resin is supplied from a feed portion of an extruder into a cylinder.

A screw compression ratio of the extruder is preferably 2.5 to 4.5 and more preferably 3.0 to 4.0. L (length of the screw)/D (diameter of the screw) is preferably 20 to 70 and more preferably 24 to 50. Preferably, the melt temperature is as described above.

Full flight, Murdock, and Damage may be used as the screw.

In order to prevent oxidation of the resin, preferably, the inside of the extruder is substituted by an inert current (nitrogen and the like) or vacuum exhaustion is performed by using an extruder provided with a vent.

(3) Filtration

Preferably, a breaker plate type of filtration is performed at an outlet of the extruder.

In order to perform the high density filtration, the lip disk filter type of filtration device is preferably provided after the resin passes through a gear pump. The filtration may be performed through a single stage or multi stages. The filtration precision of the filtration material is preferably 3 to 15 μm and more preferably 3 to 10 μm. Stainless steel and steel are preferably used as the filtration material. Among them, stainless steel is preferable. A matter in which wire rods are woven and a sintered metal filtration material may be used as the filtration material, particularly, the latter is preferable.

(4) Gear Pump

In order to obtain an improvement in precision of the thickness (a reduction in variation of the discharged amount), a gear pump is preferably provided between the extruder and the dies. Thereby, a variation width in resin pressure of the die may be set to ±1% or less.

In order to improve an amount provision performance by using the gear pump, preferably, the number of rotations of the screw is changed and a pressure before the gear pump is maintained. A high density gear pump using three or more gears is useful. Since retention in the gear pump is a factor of resin deterioration, it is preferable to form a structure in which the occurrence of retention is few. In order to stabilize an extrusion pressure, it is preferable to reduce a change in temperature of an adaptor that connects the extruder and the gear pump or the gear pump and the die. Accordingly, it is more preferable to use an aluminum injection heater.

(5) Die

If a design is performed so that the occurrence of retention of the molten resin is few in the die, any type of a T die, a fishtale die, and a hanger coat die may be used. Additionally, a static mixer may be added immediately before the T die in order to improve uniformity of the resin temperature. A clearance of the outlet portion of the T die is generally 1.0 to 5.0 times as large as the thickness of the film and preferably 1.3 to 2 times as large as the thickness of the film.

The clearance of the die is preferably controlled at the interval of 40 to 50 mm, and more preferably at the interval of 25 mm or less. Furthermore, a process in which the thickness of the film of the downstream is measured and feedback in respect to control of thickness of the die is performed is useful to reduce a change in thickness.

In order to prepare a function layer at the outside layer, it is possible to produce a film having a structure in which two or more species are provided by using a multilayered casting device.

After the resin is provided from the feed portion to the extruder, a retention time of the resin before the resin is discharged from the die is preferably 2 to 60 min and more preferably 4 to 30 min.

(6) Cast

The molten resin that is extruded above a sheet so as to be higher than the die is cooled and solidified on a casting drum to obtain a film. In connection with this, it is preferable to use a touch roll.

The number of casting drums is preferably 1 to 8 and more preferably 2 to 5, and it is preferable to perform slow cooling. The diameter of the casting roll and the touch roll is preferably 50 to 5000 mm and more preferably 150 to 1000 mm. As to the interval between a plurality of casting rolls, the interval in respect to face-to-face is preferably 0.3 to 300 mm and more preferably 3 to 30 mm.

Next, peeling-off is performed in the casting drum, and the resulting substance passes through a nip roll and then wound. The thickness of the resulting film that is not stretched is preferably 30 to 400 μm and more preferably 50 to 200 μm.

(7) Winding

It is preferable to perform trimming of both edges of the film before the winding is performed. A trimmed portion may be reused as a raw material for films. Any one of a rotary cutter, a shear blade, and a knife may be used as the trimming cutter. As to the material, carbon steel, stainless steel, or ceramic may be used. A winding tension is preferably 1 to 50 kg/m width and more preferably 3 to 20 kg/m width. In respect to the winding tension, the winding may be performed with a constant winding tension, but it is more preferable to perform the winding while a taper is attached according to the winding diameter.

Furthermore, it is necessary to control a stretch ratio between nip rolls and to prevent tension to the film in the line from being increased above a predetermined value. Before the winding, a laminate film may be attached to at least one side.

In the case of when the cellulose acylate composition of the aspect of the invention is a film, the amount of remaining organic solvent at the time when the casting is performed is preferably 0.03% by mass or less, more preferably 0.02% by mass or less, and particularly preferably 0.01% by mass or less. In the case of when the remaining solvent is in the above-mentioned range, desirably, it is difficult to generate an odor of solvent and to change physical properties of the film caused by vaporization of the solvent. The melt casting method is useful to reduce the amount of remaining solvent.

The amount of remaining solvent may be measured by using a gas chromatography method.

<Solution Casting>

Next, a preferred embodiment of the case of when cellulose acylate of the aspect of the invention is produced by using the solution casting method will be described.

In the aspect of the invention, a solvent of cellulose acylate is not limited as long as cellulose acylate is capable of being dissolved therein and subjected to flow casting. Preferable examples of the solvent may include a chlorine-based organic solvent such as dichloromethane, chloroform, 1,2-dichloroethane, and tetrachloroethylene, and a nonchlorine-based organic solvent.

Preferably, the nonchlorine-based organic solvent that is available to the aspect of the invention is selected from ester, ketone, and ether having 3 to 12 carbon atoms. Ester, ketone, and ether may have a cyclic structure. A compound that contains two or more of the functional groups (that is, —O—, —CO—, and —COO—) of ester, ketone, and ether may be used as a main solvent, or the compound may have the different functional group like an alcoholic hydroxyl group. In the case of the main solvent having two or more functional groups, the number of carbon atoms may be within a predetermined range of the compound even though it has any functional group. Examples of esters having 3 to 12 carbon atoms may include ethyl formate, propyl formate, pentyl formate, methyl acetate, ethyl acetate, and pentyl acetate. Examples of ketones having 3 to 12 carbon atoms may include aceton, methyl ethyl ketone, diethyl ketone, diisobutyl ketone, cyclopentanone, cyclohexanone, and methyl cyclohexanone. Examples of ethers having 3 to 12 carbon atoms may include diisopropyl ether, dimethoxymethane, dimethoxyethane, 1,4-dioxane, 1,3-dioxolan, tetrahydrofuran, anisole, and phenetole. Examples of the organic solvent having two or more functional groups may include 2-ethoxyethyl acetate, 2-methoxy ethanol, and 2-buthoxy ethanol.

As to a nonchlorine-based organic solvent used in the aspect of the invention, if cellulose acylate is capable of being dissolved therein and subjected to flow casting, a chlorine-based organic solvent is not limited. Preferable examples of the chlorine-based organic solvent may include dichloromethane and chloroform. Particularly, dichloromethane is preferable. Additionally, an organic solvent other than the chlorine-based organic solvent may be mixed. In this case, it is necessary to use dichloromethane in an amount of at least 50% by mass. The nonchlorine-based organic solvent that is used in the aspect of the invention will be described hereinafter. That is, preferably, the nonchlorine-based organic solvent is selected from ester, ketone, ether, alcohol, and hydrocarbon having 3 to 12 carbon atoms. Ester, ketone, ether, and alcohol may have a cyclic structure. A compound that contains two or more of the functional groups (that is, —O—, —CO—, and —COO—) of ester, ketone, and ether may be used as a solvent, or the compound may have all the different functional groups like an alcoholic hydroxyl group. In the case of the solvent having two or more functional groups, the number of carbon atoms may be within a predetermined range of the compound even though it has any functional group. Examples of esters having 3 to 12 carbon atoms may include ethyl formate, propyl formate, pentyl formate, methyl acetate, ethyl acetate, and pentyl acetate. Examples of ketones having 3 to 12 carbon atoms may include aceton, methyl ethyl ketone, diethyl ketone, diisobutyl ketone, cyclopentanone, cyclohexanone, and methyl cyclohexanone. Examples of ethers having 3 to 12 carbon atoms may include diisopropyl ether, dimethoxymethane, dimethoxyethane, 1,4-dioxane, 1,3-dioxolan, tetrahydrofuran, anisole, and phenetole. Examples of the organic solvent having two or more functional groups may include 2-ethoxyethyl acetate, 2-methoxy ethanol, and 2-buthoxy ethanol.

Furthermore, alcohol that is used in conjunction with the chlorine-based organic solvent may have a straight chain, a branched chain, or a cyclic structure. Among them, preferable is saturated aliphatic hydrocarbon. The hydroxyl group of alcohol may be any one of those of primary to tertiary alcohols. Examples of alcohols include methanol, ethanol, 1-propanol, 2-propanol, 1-butanol, 2-butanol, tert-butanol, 1-pentanol, 2-methyl-2-butanol, and cyclohexanol. In addition, fluorine-based alcohol may be used. For example, 2-fluoroethanol, 2,2,2-trifluoroethanol, 2,2,3,3-tetrafluoro-1-propanol may be used. Additionally, hydrocarbons may have a straight chain, a branched chain, or a cyclic structure. Any one of aromatic hydrocarbons and aliphatic hydrocarbons may be used. The aliphatic hydrocarbons may be saturated or unsaturated. Examples of the hydrocarbons include cyclohexane, hexane, benzene, toluene, and xylene.

Examples of the nonchlorine-based organic solvent that is used in conjunction with the chlorine-based organic solvent as the main solvent applied to the cellulose acylate include, but are not limited to methyl acetate, ethyl acetate, methyl formate, ethyl formate, aceton, dioxolan, dioxane, ketones or ester acetates having 4 to 7 carbon atoms, or alcohols or hydrocarbons having 1 to 10 carbon atoms. Furthermore, preferable examples of the nonchlorine-based organic solvent may include methyl acetate, aceton, methyl formate, ethyl formate, methyl ethyl ketone, cyclopentanon, cyclohexanon, acetyl methyl acetate, methanol, ethanol, 1-propanol, 2-propanol, 1-butanol, 2-butanol, cyclohexanol, cyclohexane, and hexane.

It is preferable that the cellulose acylate according to the aspect of the invention be dissolved in the organic solvent in an amount of 10 to 35% by mass. In the cellulose acylate solution, the amount is more preferably 13 to 30% by mass and particularly preferably 15 to 28% by mass. In order to dissolve the cellulose acylate at the above-mentioned concentration, the dissolution may be performed so that a predetermined concentration is ensured at the dissolution step, or a solution having a low concentration (for example, 9 to 14% by mass) is prepared in advance and then concentrated so that a predetermined high concentration solution is obtained during the concentration process as described below. Alternatively, after the cellulose acylate solution having the high concentration is prepared in advance, various types of additives may be added to produce the cellulose acylate solution having a predetermined low concentration. Any method of the above-mentioned methods may be used as long as the desired concentration of the cellulose acylate solution according to the aspect of the invention is obtained.

As to the preparation of the cellulose acylate solution (dope) according to the aspect of the invention, the dissolution method is not limited and may be performed at room temperature. Additionally, the dissolution may be performed by using a cooling dissolution method, a high temperature dissolution method, or a combination thereof. With respect to this, a method of preparing a cellulose acylate solution is disclosed in, for example, JP-A-1993-163301, JP-A-1986-106628, JP-A-1983-127737, JP-A-1997-95544, JP-A-1998-95854, JP-A-1998-45950, JP-A-2000-53784, JP-A-1999-322946, JP-A-1999-322947, JP-A-1990-276830, JP-A-2000-273239, JP-A-1999-71463, JP-A-1992-259511, JP-A-2000-273184, JP-A-1999-323017, and JP-A-1999-302388. As to the above-mentioned dissolution methods of cellulose acylate to the organic solvent, if the methods are in the desirable range of the aspect of the invention, they can be used. In respect to details thereof, particularly, details of the nonchlorine-based solvent system, the method that is disclosed in detail in the Journal of Technical Disclosure of Japan Institute of Invention and Innovation (Article No. 2001-1745, published on Mar. 15, 2001, pages 22 to 25, Japan Institute of Invention and Innovation) is performed. In addition, the cellulose acylate solution according to the aspect of the invention is generally subjected to solution concentration and filtration, and is described in detail in the Journal of Technical Disclosure of Japan Institute of Invention and Innovation (Article No. 2001-1745, published on Mar. 15, 2001, page 25, Japan Institute of Invention and Innovation). Additionally, in the case of when the dissolution is performed at high temperatures, the temperature is generally the boiling point of the used organic solvent or higher. In this case, the dissolution is performed while pressure is applied.

In respect to the cellulose acylate solution according to the aspect of the invention, it is preferable that viscosity and kinetic storage elasticity of the solution be within a predetermined range. 1 mL of sample solution is analyzed by using a rheometer (CLS 500) and a steel cone having a diameter of 4 cm/2° (all of them are products manufactured by TA Instruments, Co.). As to the analysis conditions, the analysis is performed while an oscillation step/temperature ramp is 2° C./min in respect to the range of 40 to −10° C., and static non-Newtonian viscosity n*(Pa·s) at 40° C. and storage elasticity G' (Pa) at −5° C. are obtained. Furthermore, after the temperature of the sample solution is maintained until the temperature of liquid is made constant at an analysis initiation temperature, the analysis starts to be performed. In the aspect of the invention, preferably, the viscosity at 40° C. is 1 to 400 Pa·s and dynamic storage elasticity at 15° C. is 500 Pa or more. More preferably, the viscosity at 40° C. is 10 to 200 Pa·s and dynamic storage elasticity at 15° C. is 100 to 1,000,000 Pa. In addition, it is preferable that the dynamic storage elasticity be as high as possible at low temperatures. For example, in the case of when the flow casting support is at −5° C., it is preferable that the dynamic storage elasticity be 10,000 to 1,000,000 Pa at −5° C. In the case of when the support is at −50° C., it is preferable that the dynamic storage elasticity be 10,000 to 5,000,000 Pa at −50° C.

(Specific Procedure of Solution Casting)

Next, a method for producing a cellulose acylate film according to the aspect of the invention will be described. As to the method and the device for producing the cellulose acylate film according to the aspect of the invention, a solution flow casting method and a solution flow casting device that are used to produce a known cellulose acylate film are used. A dope (cellulose acylate solution) that is prepared in a dissolution device (pot) is stored in a storage pot to remove bubbles from the dope, thereby achieving final preparation. The dope is discharged from a dope discharge portion through a pressure quantitative gear pump that is capable of performing quantitative analysis and transporting liquid with high precision by using the number of rotations to a pressure die. The dope is uniformly flow cast from a nozzle of a pressure die (slit) onto a metal support of a flow casting portion that is endlessly operated, so that a dope layer (this is usually called web) which is insufficiently dried is peeled off from the metal support at a peeling point where the metal support almost circuits. Both edges of the obtained web are fixed by using clips, transported by using a tenter while its width is maintained, dried, transported to a group of rolls of a dryer to finish the drying, and wound by using a winding machine so as to ensure a predetermined length. The combination of the tenter and a group of rolls of the dryer depends on the purpose. In the solution flow casting method that is applied to halogenated silver photosensitive photo materials or functional films for protecting electronic displays, in addition to the solution flow casting device, a coating device is frequently provided to perform surface treatment in respect to films such as a under coat layer, a charge prevention layer, a halation prevention layer, and a protective layer. Production processes in respect to them are disclosed in detail in the Journal of Technical Disclosure of Japan Institute of Invention and Innovation (Article No. 2001-1745, published on Mar. 15, 2001, pages 25 to 30, Japan Institute of Invention and Innovation) is performed, and are classified into flow casting (cocasting is contained), metal supports, drying, peeling, stretching, and the like.

In the aspect of the invention, a space temperature of a flow casting portion is not limited, but preferably −50 to 50° C., more preferably −30 to 40° C., and particularly preferably −20 to 30° C. Particularly, the cellulose acylate solution that is flow cast at the low space temperature is instantaneously cooled on the support to improve a gel strength, thereby forming the film that contains the organic solvent. Therefore, the peeling from the support may be performed for a short time while the organic solvent is not vaporized from the cellulose acylate, and high-speed flow casting may be achieved. Furthermore, air, nitrogen, argon, helium, or the like may be used as means for cooling the space, and the type of means is not limited. In this case, the relative humidity is preferably 0 to 70% and more preferably 0 to 50%. Furthermore, in the aspect of the invention, the temperature of the support of the flow casting portion in which the cellulose acylate solution is flow cast is −50 to 130° C., preferably −30 to 25° C., and more preferably −20 to 15° C. In order to maintain the flow casting portion at the temperature of the aspect of the invention, cooled gas may be supplied to the flow casting portion or the space may be cooled by disposing a cooling device at the flow casting portion. In connection with this, it is necessary to prevent water from being attached, and a method using dry gas may be performed.

According to the aspect of the invention, in respect to the contents and the flow casting of the layers, the following configuration is preferable. That is, preferably, the cellulose acylate solution is a cellulose acylate solution that contains at least one plasticizer of liquid or solid at 25° C. in an amount of 0.1 to 20% by mass based on cellulose acylate, a cellulose acylate solution that contains at least one ultraviolet absorbing agent of liquid or solid in an amount of 0.001 to 5% by mass based on cellulose acylate, a cellulose acylate solution that contains at least one solid including fine particles having an average particle size of 5 to 3000 nm in an amount of 0.001 to 5% by mass based on cellulose acylate, a cellulose acylate solution that contains at least one fluorine-based surfactant in an amount of 0.001 to 2% by mass based on cellulose acylate, a cellulose acylate solution that contains at least one peeling agent in an amount of 0.0001 to 2% by mass based on cellulose acylate, a cellulose acylate solution that contains at least one deterioration prevention agent in an amount of 0.0001 to 2% by mass based on cellulose acylate, a cellulose acylate solution that contains at least one optical anisotropic control agent in an amount of 0.1 to 15% by mass based on cellulose acylate, and/or a cellulose acylate solution that contains at least one infrared absorbing agent in an amount of 0.1 to 5% by mass based on cellulose acylate, and it is preferable that the cellulose acylate film be produced using the above-mentioned cellulose acylate solution.

During the flow casting process, one type of cellulose acylate solution may be subjected to single layer flow casting, or two or more types of cellulose acylate solutions may be subjected to cocasting simultaneously or sequentially. In the case of when flow casting of two or more layers are performed, in respect to the produced cellulose acylate solution and the cellulose acylate film that is produced by using the cellulose acylate solution, preferably, chlorine-based solvent compositions of the layers are the same as each other or different from each other, additives of the layers are one type or a mixture containing two or more types, the additives of the layers are added to the same layer or the different layers, concentrations of the solutions of the additives are the same as each other or different from each other in respect to the layers, molecular weights of associates of the layers are the same as each other or different from each other, temperatures of the solutions of the layers are the same as each other or different from each other, coating amounts of the layers are the same as each other or different from each other, viscosities of the layers are the same as each other or different from each other, film thicknesses of the layers after the drying are the same as each other or different from each other, materials of the layers are on the same state or distribution or different states or distributions, physical properties of the layers are the same as each other or different from each other, or the physical properties of the layers are on the same physical property distribution or different physical property distributions. In connection with this, the physical properties include physical properties that are disclosed in detail in the Journal of Technical Disclosure of Japan Institute of Invention and Innovation (Article No. 2001-1745, published on Mar. 15, 2001, pages 6 and 7, Japan Institute of Invention and Innovation). Examples thereof include haze, permeability, spectral properties, retardation Re, retardation Rth, molecular alignment axis, axial misalignment, tearing strength, folding strength, tensile strength, a difference in inner and outer Rts of wound matters, creaking, dynamic friction, alkaline hydrolysis, curl values, water content, remaining solvent amounts, thermal shrinkage, high humidity dimension evaluation, water vapor permeation, flatness of bases, dimensional stability, thermal shrinking initiation temperatures, elasticity, observance of bright impurity, impedance that is used to evaluate bases, and surface states. Furthermore, a yellow index, transparency, and thermal physical properties (Tg and crystallization heat) of the cellulose acylate that are disclosed in detail in the Journal of Technical Disclosure of Japan Institute of Invention and Innovation (Article No. 2001-1745, published on Mar. 15, 2001, page 11, Japan Institute of Invention and Innovation) may be included.

<Treatment of the Cellulose Acylate Film>
(Stretching)

The cellulose acylate film that is produced by using the melt casting method or the solution casting method is preferably stretched in order to improve the surface shape, ensure desirable Re and Rth, and improve linear expansibility.

The stretching may be carried out on-line during the casting process or may be carried out off-line after the cellulose acylate film is wound-up once after completion of the casting. That is, in the case of when the melt casting is performed, the stretching may be performed while the cooling is not finished during the casting process or after the cooling is finished.

The above stretching may be carried out at temperature in the range of preferably from Tg to (Tg+50° C.), more preferably from (Tg+1° C.) to (Tg+30° C.), and particularly preferably from (Tg+2° C.) to (Tg+20° C.). A stretching ratio may be preferably from 0.1 to 500%, more preferably from 10 to 300%, and particularly preferably from 30 to 200%. The stretching may be carried out in a single step or multiple steps. The stretching ratio herein used is defined as described below:

Stretch ratio (%)=100×{(length after stretching)−(length before stretching)}/(length before stretching).

Such stretching may be achieved by lengthwise stretching, crosswise stretching, and a combination thereof. The lengthwise stretching may include (1) roll stretching (stretching which is performed in the direction of the length by the use of two or more pairs of nip roles, the rim speed at the outlet of which is higher) and (2) fixed stage stretching (stretching which is performed in the direction of the length by increasingly rapidly transporting the film in a length direction while both edges of the film are held). Furthermore, the crosswise stretching may include a tenter stretching (stretching in which both edges of a film are grasped by a chuck and extended to crosswise direction (the direction perpendicular to lengthwise direction)). The lengthwise stretching and the crosswise direction may be performed separately (uniaxial stretching) or in a combination thereof (biaxial stretching). In the case of when the biaxial stretching is performed, the lengthwise stretching and the crosswise stretching may be sequentially performed (sequential stretching) or simultaneously performed (simultaneous stretching).

The stretching speeds of the lengthwise stretching and the crosswise stretching are preferably from 10%/minute to 10000%/minute, more preferably from 20%/minute to 1000%/minute, and particularly preferably from 30%/minute to 800%/minute. In the case of when the multistep stretching is performed, an average value of the stretching speeds of the steps is used.

After the stretching, it is preferable that lengthwise or crosswise relaxation be performed by 0 to 10%. Furthermore, after the stretching, it is preferable to perform heat fixing at 150 to 250° C. for 1 sec to 3 min.

After the stretching, the film thickness is preferably 10 to 300 μm, more preferably 20 to 200 μm, and particularly preferably 30 to 100 μm.

An angle ($\theta$) which the direction of casting (lengthwise direction) forms with a retardation axis of Re of a film is preferably as closer as possible to 0°, +90°, or −90°. That is to say, in the case of the lengthwise stretching, it is preferably as closer as possible to 0°, more preferably 0±3°, even more preferably 0±2°, and particularly preferably 0±1°. In the case of the crosswise stretching, it is preferably 90±3° or −90±3°, more preferably 90±2° or −90±2°, and particularly preferably 90±1° or −90±1°.

The unstretched or stretched cellulose acylate film may be used alone or in conjunction with a polarizing plate, and a liquid crystal layer, a layer that has a controlled refractive index (low reflective layer), or a hard coating layer may be provided thereon.

(Photoelasticity)

The cellulose acylate film that is obtained by using the production method according to the aspect of the invention is preferably used as a protective film of a polarizing plate or a retardation film. In the case of when the cellulose acylate film is used as the protective film of the polarizing plate or the retardation film, birefringence (Re and Rth) may be changed due to stress caused by stretching and shrinkage due to moisture absorption. The change of the birefringence according to the stress may be measured by using the photoelasticity.

The photoelasticity is preferably $5 \times 10^{-7}$ (cm$^2$/kgf) to $30 \times 10^{-7}$ (cm$^2$/kgf), more preferably $6 \times 10^{-7}$ (cm$^2$/kgf) to $25 \times 10^{-7}$ (cm$^2$/kgf), and particularly preferably $7 \times 10^{-7}$ (cm$^2$/kgf) to $20 \times 10^{-7}$ (cm$^2$/kgf).

(Surface Treatment)

An unstretched or stretched cellulose acylate film may be subjected to a surface treatment, if necessary, in order to improve adhesion strength between the cellulose acylate film and each functional layer (e.g., undercoat layer and back layer). For example, a glow discharge treatment, an ultraviolet ray treatment, a corona treatment, a flame treatment, an acid treatment, or an alkali treatment may be applied. The glow discharge treatment referred to herein may be a treatment with low-temperature plasma performed in a low-pressure gas at a pressure of $10^{-3}$ to 20 Torr or preferably with plasma at the atmospheric pressure. A plasma excitation gas is a gas which can be excited to plasma under conditions as described above, and examples thereof include argon, helium, neon, krypton, xenon, nitrogen, carbon dioxide, chlorofluorocarbons such as tetrafluoromethane, and a mixture thereof. Details thereof are described in the Journal of Technical Disclosure of Japan Institute of Invention and Innovation (Article No. 2001-1745, published on Mar. 15, 2001, pages 30 to 32, Japan Institute of Invention and Innovation). In the plasma treatment at the atmospheric pressure, to which attention has been paid in recent years, for example, a radiating energy of 20 to 500 kgy is used under a condition of 10 to 1,000 keV, and preferably a radiating energy of 20 to 300 kgy is used under a condition of 30 to 500 keV. Of these treatments, an alkali saponifying treatment is particularly preferable, which treatment is very useful to perform the surface treatment for cellulose acylate film.

The alkali saponifying treatment may be conducted by immersing the film into a saponifying solution, or applying a saponifying solution onto the film. In the case of the immersing method, the treatment can be attained by passing the film into a tank wherein an aqueous solution of NaOH, KOH, or the like which has a pH of 10 to 14 and is heated to 20 to 80° C., is put for 0.1 to 10 minutes, neutralizing the solution on the film, washing the film, and drying the film.

Examples of the application method may include dip coating, curtain coating, extrusion coating, bar coating, and E type coating. As the solvent in the alkali saponifying treatment coating solution, it is preferable to employ a solvent which has an excellent wettability appropriate for applying the saponifying solution to a support and can hold favorable surface conditions without forming any irregularity on the support surface. More specifically speaking, it is preferable to use an alcoholic solvent, and particularly preferably isopropyl alcohol. It is also possible to employ an aqueous solution of a surfactant as the solvent. As the alkali in the liquid saponifying solution, it is preferable to use an alkali soluble in the above-described solvent, and KOH and NaOH are still preferable. It is preferable that the liquid saponifying agent have a pH value of 10 or more, still preferably 12 or more. Concerning the reaction conditions during the alkali saponification, it is preferable to perform the saponification at room temperature for 1 sec to 5 minutes, still preferably for 5 seconds to 5 minutes, and particularly preferably for 20 seconds to 3 minutes. After the completion of the alkali saponification reaction, it is preferable to wash the face coated with the liquid saponifying agent by using water or by using an acid and then water. The solution-applying manner saponifying treatment, and the application of an alignment film, which will be detailed later, may be continuously conducted. In the case, the number of steps can be reduced. These saponifying methods are specifically described in, for example, JP-A-2002-82226 and WO 02/46809.

It is preferable to form an undercoat layer on the film in order to bond the film to a functional layer. This layer may be applied onto the film after the above-mentioned surface treatment is conducted, or without conducting any surface treatment. Details of the undercoat layer are described in the Journal of Technical Disclosure of Japan Institute of Invention and Innovation (Article No. 2001-1745, published on Mar. 15, 2001, page 32, Japan Institute of Invention and Innovation).

The surface treatment and the priming process may be integrated, as a final stage, into the casting process, or may be carried out independently or in the middle of the process of providing the functional layer, which will be detailed just below.

<Combination with the Functional Layer>

The cellulose acylate film according to the aspect of the invention may be combined with the functional layers, details of which are described in the Journal of Technical Disclosure of Japan Institute of Invention and Innovation (Article No. 2001-1745, published on Mar. 15, 2001, pages 32 to 45, Japan Institute of Invention and Innovation). Among these functional layers, preferable are provision of a polarizing film (formation of a polarizing plate), provision of an optically compensating layer (an optically compensating sheet), and provision of an antireflection layer (an antireflection film).

[Polarizing Film]

(Material of the Polarizing Film)

At present, a commercially available polarizing film may be generally formed by immersing a stretched polymer into a solution of iodine or a dichroic dye in a bath, thereby causing the iodine or dichroic dye to permeate the binder. As the polarizing film, a coating type polarizing film, typical examples of which are manufactured by Optiva Inc., may also be used.

The iodine and the dichroic dye in the polarizing film are aligned in the binder, thereby exhibiting polarizing performance. Examples of dichroic dyes include azo series dyes, stilbene series dyes, pyrazolone series dyes, triphenylmethane series dyes, quinoline series dyes, oxazine series dyes, thiazine series dyes, and anthraquinone series dyes. Of these dyes, water-soluble dyes are preferred. The dichroic dyes preferably contain hydrophilic substituent (for example, sulfo, amino, and hydroxyl groups). Examples thereof may include compounds described in the Journal of Technical Disclosure of Japan Institute of Invention and Innovation (Article No. 2001-1745, page 58, published on Mar. 15, 2001, Japan Institute of Invention and Innovation).

The binders of the polarizing film may be polymers capable of cross-linking by themselves, polymers capable of undergoing cross-linking reaction in the presence of a cross-linking agent, or combinations thereof. Examples of these binders include methacrylate-based copolymers, styrene-based copolymers, polyolefins, polyvinyl alcohols and modified polyvinyl alcohols, poly(N-methylolacrylamides), polyesters, polyimides, vinyl acetate copolymers, carboxymethyl celluloses, polycarbonates, and the like described in paragraph [0022] of the specification in JP-A-1996-338913. A silane coupling agent may be used as a polymer.

Of them, the water-soluble polymers (for example, poly(N-methylolacrylamides), carboxymethyl celluloses, gelatin, polyvinyl alcohols and modified polyvinyl alcohols) are preferable, gelatin, and polyvinyl alcohols and modified polyvinyl alcohols are more preferable, polyvinyl alcohols and modified polyvinyl alcohols are particularly preferable. It is particularly preferable to use two types of polyvinyl alcohols or modified polyvinyl alcohols having different polymerization degrees. Polyvinyl alcohols usable in the invention have a saponification degree in the range of preferably 70 to 100% and more preferably 80 to 100%.

The polymerization degree of the polyvinyl alcohols is preferably from 100 to 5,000.

With regard to modified polyvinyl alcohols, they are disclosed in JP-A-1996-338913, JP-A-1997-152509, and JP-A-1997-316127. Two or more types of polyvinyl alcohols and modified polyvinyl alcohols may be used together.

It is preferable that the lower limit of the thickness of the binder be 10 μm. The upper limit of the thickness is preferably as small as possible in the views of light leakage from the liquid crystal display device. The thickness is preferably the same as that (about 30 μm) of polarizing plates commercially available at the present or lower than that, is more preferably 25 μm or less, and particularly preferably 20 μm or less.

The binder in the polarizing film may be crosslinked. A polymer or monomer having a crosslinkable functional group may be incorporated into the binder, or a crosslinkable functional group may be given to the binder polymer itself. The crosslinking may be attained by light, heat, or pH change, so as to make it possible to cause the binder to have a crosslinked structure. Crosslinking agents are disclosed in U.S. Pat. Reissue No. 23297. A boron compound (for example, boric acid or borax) may also be used as a crosslinking agent. The amount of the crosslinking agent added to the binder is preferably from 0.1 to 20 wt % based on the binder. In this case, the alignment of the polarizer and the wet heat resistance of the polarizing film become good.

After the end of the crosslinking reaction, the amount of the crosslinking agent which has not reacted is preferably 1.0% by mass or less and more preferably 0.5% by mass or less. Thereby, the weather resistance of the film is improved.

(Stretching of the Polarizing Film)

It is preferable that the polarizing film be stretched (stretching process) or be rubbed (rubbing process) and then dyed with iodine or a dichroic dye.

In the case of the stretching process, the stretch ratio is preferably 2.5 to 30.0 and more preferably 3.0 to 10.0. The stretching may be carried out by dry stretching in the air. Alternatively, wet stretching may be performed while the film is immersed in water. The stretch ratio of the dry stretching is preferably from 2.5 to 5.0, and the stretch ratio of the wet stretching is preferably from 3.0 to 10.0. The stretch ratio means a ratio of the length of the polarizing film after the stretching/the length of the polarizing film before the stretching. The stretching may be performed in parallel to the MD direction (parallel stretching), or obliquely (oblique stretching). The stretching may be attained by one stretching operation or plural stretching operations. The stretching based on the plural stretching operations makes it possible to stretch the uniformly even when a high-ratio stretching is performed. More preferable is oblique stretching where the film is stretched at an angle of 10 to 80° oblique to the film-carried direction.

(1) Parallel Stretching Process

Before the film is stretched, the PVA film is swelled. The swelling degree thereof (the mass ratio of the film before the swelling to the film after the swelling) is generally 1.2 to 2.0. Thereafter, while the film may be continuously transported through guide rolls and the like, the film is stretched in an aqueous medium bath or a dyeing bath where a dichroic material is dissolved at a bath temperature of generally 15 to 50° C., and preferably 17 to 40° C. The stretching may be attained by grasping the film by means of two pairs of nip rolls, the transportation rate of the backward nip rolls being made larger than that of the forward nip rolls. The stretch ratio (the ratio of the length of the stretched film to that of the film at the initial stage: identical wording thereafter), is preferably 1.2 to 3.5, and more preferably 1.5 to 3.0 from the viewpoint of the above-mentioned effects. Thereafter, the film is dried at 50 to 90° C. to obtain a polarizing film.

(2) Oblique Stretching Process

As this process, a method described in JP-A-2002-86554 may be used wherein a tenter projected in an oblique direction is used to perform stretching. Since this stretching is performed in the air, it is necessary to hydrate the film beforehand so as to be made easy to stretch. The water content in the film is preferably 5 to 100%, and more preferably 10 to 100%.

The temperature when the film is stretched is preferably 40 to 90° C., and more preferably from 50 to 80° C. The relative humidity is preferably 50 to 100%, more preferably 70 to 100%, and particularly preferably 80 to 100%. The advance speed in the longitudinal direction is preferably 1 m/minute or more, and more preferably 3 m/minute or more.

After the end of the stretching, the film is dried at preferably 50 to 100° C. and more preferably 60 to 90° C. for preferably 0.5 to 10 minutes and more preferably 1 to 5 minutes.

The angle of the absorption axis of the thus-obtained polarizing film is preferably 10 to 800, and more preferably 30 to 60°, and substantially particularly preferably 45° (40 to 500).

[Adhesion]

The saponified cellulose acylate film and the polarizing layer prepared by the stretching may be adhered to each other to prepare a polarizing plate. About the direction along which they are adhered to each other, the angle between the directions of the flow casting axis of the cellulose acylate film and the stretch axis of the polarizing plate is preferably set to 45°.

The adhesive agent for the adhesion is not particularly limited. Examples thereof include PVA-based resins (comprising modified PVA which modified with an acetoacetyl, sulfonic acid, carboxyl, oxyalkylene or some other group) or an aqueous solution of a boron compound. Among them, the PVA-based resins are preferable. The thickness of the adhesive agent layer is preferably 0.01 to 10 μm, and more preferably 0.05 to 5 μm after the layer is dried.

It is preferable that the light permeability of the thus-obtained polarizing plate be higher and the polarization degree thereof be higher. The permeability of the polarizing plate in respect to light having a wavelength of 550 nm is preferably 30 to 50%, more preferably 35 to 50%, and particularly preferably 40 to 50%. The polarization degree thereof to light having a wavelength of 550 nm is preferably 90 to 100%, more preferably 95 to 100%, and particularly preferably 99 to 100%.

The thus-obtained polarizing plate is laminated on a λ/4 plate, whereby a circular polarization plate can be produced. In this case, the laminating is carried out to set the angle between the retardation axis of the λ/4 plate and the absorption axis of the polarizing plate to 45°. At this time, the λ/4 plate is not particularly limited, and is preferably a λ/4 plate having a wavelength dependency such that the retardation thereof is smaller to a lower wavelength. It is also preferable to use a λ/4 plate composed of a polarizing film having an absorption axis inclined at an angle of 20 to 70° to the longitudinal direction and an optically anisotropic layer made of a liquid crystal compound.

[Provision of an Optically Compensating Layer (Production of an Optically Compensating Sheet)]

The optically anisotropic layer is a layer for making compensation for a liquid crystal compound in a liquid crystal cell in a liquid crystal display device at the time of black display, and is provided by forming an alignment film on cellulose acylate film and further forming an optically anisotropic layer thereon.

(Alignment Film)

An alignment film is provided on the above-mentioned surface-treated cellulose acylate film. This film has a function of deciding the alignment direction of liquid crystal molecules. However, if a liquid crystal compound is aligned and subsequently the alignment state is fixed, the alignment film is not essential as a constituent element since the alignment film has fulfilled the function thereof. In other words, only the optically anisotropic layer which is in a fixed alignment state and is formed on the alignment film is transferred onto a polarizer, whereby the polarizing plate using cellulose acylate film according to the aspect of the invention can be produced.

The alignment film may be provided by rubbing an organic compound (preferably a polymer), performing oblique evaporation of an inorganic compound, forming a layer having a micro groove, or performing accumulation of an organic compound (for example, ω-tricosanoic acid, dioctadecylmethylammonium chloride or methyl stearate) by the Langmuir-Blodgett method (LB film). Furthermore, there have been known alignment films having an alignment function imparted thereto by applying an electrical field or a magnetic field, or radiating light.

It is preferable to form the alignment film by performing rubbing treatment of a polymer. In principle, the polymer used in the alignment film has a molecular structure having a function of aligning liquid crystal molecules.

According to the aspect of the invention, it is preferable to not only cause the polymer used in the alignment film to have the above-mentioned function of aligning liquid crystal molecules, but also introduce, into the main chain of the polymer, a side chain having a crosslinkable functional group (for example, a double bond), or it is preferable to introduce, into a side chain of the polymer, a crosslinkable functional group having a function of aligning liquid crystal molecules.

The polymers used in the alignment film may be polymers capable of cross-linking by themselves, polymers capable of undergoing cross-linking reaction in the presence of a cross-linking agent, or combinations thereof. Examples of the polymers include methacrylate-based copolymers described in paragraph [0022] of the specification in JP-A-1996-338913, styrene-based copolymers, polyolefins, polyvinyl alcohols and modified polyvinyl alcohols, poly(N-methylolacrylamides), polyesters, polyimides, vinyl acetate copolymers, carboxymethyl celluloses, polycarbonates, and the like. A silane coupling agent may be used as a polymer. Water-soluble polymers (for example, poly(N-methylolacrylamides), carboxymethyl celluloses, gelatin, and polyvinyl alcohols or modified polyvinyl alcohols) are preferable. Gelatin, polyvinyl alcohols, and modified polyvinyl alcohols are more preferable, polyvinyl alcohols and modified polyvinyl alcohols are even more preferable. It is particularly preferable to use two types of polyvinyl alcohols or modified polyvinyl alcohols having different polymerization degrees. Polyvinyl alcohols have a saponification degree in the range of, preferably 70 to 100%, and more preferably 80 to 100%. It is preferable that the polymerization degree of polyvinyl alcohols be 100 to 5000.

The side chain having a function of aligning liquid crystal molecules generally has a hydrophobic group as a functional group. Specifically, the type of functional group depends on the type of the liquid crystal molecule and a required alignment state.

For example, the modifying groups of the modified polyvinyl alcohol may be introduced by copolymerization modification, chain transfer modification, and block polymerization modification. Examples of the modifying groups may include hydrophilic groups (carboxylic acid group, sulfonic acid group, phosphonic acid group, amino group, ammonium group, amide group, thiol group, and the like), a hydrocarbon group having 10 to 100 carbon atoms, a fluorine atom-substituted hydrocarbon group, a thioether group, a polymerizable group (unsaturated polymerizable group, epoxy group, aziridinyl group, and the like), and an alkoxysilyl group (trialkoxysilyl group, dialkoxy group, monoalkoxy group, and the like). Examples of the modified polyvinyl alcohol compounds are disclosed in paragraphs [0022] to [0145] of JP-A-2000-155216 and paragraphs [0018] to [0022] of JP-A-2002-62426.

When a side chain having a crosslinkable functional group is bonded to the main chain of the aligned film polymer or a crosslinkable functional group is introduced into a side chain thereof having a function of aligning liquid crystal molecules, the aligned film polymer may be copolymerized in conjunction with a polyfunctional monomer contained in the optically anisotropic layer. As a result, strong bonding is attained by covalent bonds between the polyfunctional monomers, between the aligned film polymers, and between the polyfunctional monomers and the aligned film polymers. Consequently, the introduction of the crosslinkable functional group into the aligned film polymer makes it possible to improve the strength of the optically compensating sheet remarkably.

The crosslinkable functional group of the aligned film polymer preferably contains a polymerizable group in the same manner as the polyfunctional monomer. Specific examples thereof are described in paragraphs [0080] to [0100] of JP-A-2000-155216. The aligned film polymer may be crosslinked with a crosslinking agent, separately in respect to the above-mentioned crosslinkable functional group.

Examples of the crosslinking agent include aldehydes, N-methylol compounds, dioxane derivatives, compounds that works when the carboxylic group is activated, active vinyl compounds, active halogen compounds, isooxazoles, and dialdehyde starch. Two or more crosslinking agents may be used in combination. Specifically, compounds described in paragraphs [0023] to [0024] of JP-A-2002-62426 may be used. Aldehydes having high reactivity are preferable, and glutaraldehydes are particularly preferable.

The amount of the added crosslinking agent is in the range of preferably 0.1 to 20% by mass, and more preferably 0.5 to 15% by mass based on the polymer. The amount of unreacted crosslinking agent remaining in the alignment film is preferably 1.0% by mass or less, and more preferably 0.5 mass % or less. The adjustment as described above makes it possible to give a sufficient endurance to the aligned film without generating any reticulation even if the aligned film is used in a liquid crystal display device for a long time or is allowed to stand still in high-temperature and high-humidity atmosphere for a long time.

For example, the aligned film may be formed by applying the solution on the cellulose acylate film, drying (crosslinking) the solution by heating, and rubbing the resulting film. The cross-linking reaction, as mentioned above, may be carried out in at a predetermined stage after the solution is applied on the cellulose acylate film. In the case of using a water-soluble polymer, such as polyvinyl alcohol, as the aligned film forming material, a mixture solvent of water with an organic solvent having a defoaming ability (for example, methanol) is preferably used as the coating solution. The mass ratio of water to methanol is preferably 0:100 to 99:1, and more preferably from 0:100 to 91:9. Accordingly, the generation of foams may be prevented in order to ensure significantly decreased defects in the aligned film, and the surface of the optically anisotropic layer.

Preferable examples of an application method of the aligned film include a spin coating method, a dip coating method, a curtain coating method, an extrusion coating method, a rod coating method, or a roll coating method. The rod coating method is particularly preferable. It is preferable that the thickness of the polymer layer after the drying be 0.1 to 10 μm. The drying by heating may be performed at a temperature of 20 to 110° C. In order to form cross-links to a satisfactory extent, the drying temperature is preferably 60 to 100° C., and particularly preferably 80 to 100° C. The drying time is generally 1 minute to 36 hours, and preferably 1 to 30 minutes. Further, it is preferable to adjust the pH to an optimum value for the cross-linking agent used. In the case of using glutaraldehyde, the pH is generally 4.5 to 5.5, and particularly preferably 5.

The alignment film is provided on the cellulose acylate film or the undercoat layer according to the aspect of the invention. After the above-described polymer layer is crosslinked, the surface of the layer may be subjected to rubbing treatment to form the alignment film.

In respect to the above-mentioned rubbing treatment, the treatment methods extensively used to align liquid crystals performed during the production of liquid crystal displays may be used. That is, the method of rubbing the surface of an alignment film in a predetermined direction by means of paper, gauze, felt, rubber, or nylon or polyester fibers may be used to obtain alignment. In general, it can be carried out by rubbing several times the polymer surface by using cloths into which fibers having the same length and the same diameter are transplanted evenly.

In the case of when the rubbing treatment method is industrially performed, it may be achieved by bringing a rotating rubbing roll into contact with a film to which the transported polarizing film is attached. However, it is preferable that the circularity, cylindricality, and fluctuation (eccentricity) of the rubbing roll all be 30 μm or below. It is preferable that the wrap angle of a film to the rubbing roll be 0.1 to 90°. However, as disclosed in JP-A-1996-160430, there is a case that the steady rubbing treatment is ensured by winding a film around the roll at an angle of 360° or more. It is preferable that the film be transported at a speed of 1 to 100 m/min. Further, it is preferable that the rubbing angle be in the range of 0 to 60°. In the case of when the film is applied to a liquid crystal display device, the rubbing angle is preferably 40 to 50°. In particular, it is preferable to adjust the rubbing angle to 45°.

The film thickness of the thus-obtained aligned film is preferably in the range of 0.1 to 10 μm.

(Optically Anisotropic Layer)

Next, liquid crystal molecules of an optically anisotropic layer are aligned on the aligned film. Thereafter, the aligned film polymer may be reacted with the polyfunctional monomer contained in the optically anisotropic layer or crosslinked by using a crosslinking agent, if necessary.

The liquid crystal molecules used in the optically anisotropic layer may be rod-like liquid crystal molecules or disk-like liquid crystal molecules. The rod-like liquid crystal molecules and the disk-like liquid crystal molecules may each be a high molecular weight liquid crystal or a low molecular weight liquid crystal. Furthermore, a compound about which a low molecular weight liquid crystal is crosslinked to exhibit no liquid crystallinity may be included.

1) Rod-Like Liquid Crystal Molecule]

As to the above rod-like liquid crystal molecule, azomethines, azoxys, cyanobiphenyls, cyanophenylesters, benzoic acid esters, cyclohexane carboxylic acid phenylesters, cyanophenylcyclohexanes, cyano-substituted phenylpyrimidines, alkoxy-substituted phenylpyrimidines, phenyldioxanes, tolans, and alkenylcyclohexylbenzonitrils, and the like may be used preferably.

Furthermore, a metal complex is contained in the rod-like liquid crystal molecule. In addition, a liquid crystal polymer that contains the rod-like liquid crystal molecule in the repeating unit thereof may also be used as the rod-like liquid crystal molecule. In other words, the rod-like liquid crystal molecule may be bonded to a (liquid crystal) polymer.

Rod-like liquid crystal molecules are described in Quarterly Chemical Review, Vol. 22, "Chemistry of Liquid Crystal" edited by the Chemical Society of Japan (1994), Chapters 4, 7, and 11, and "Liquid Crystal Device Handbook" edited by Japan Society for the Promotion of Science, 142nd Committee, chapter 3.

The birefringence of the rod-like liquid crystal molecules is preferably 0.001 to 0.7.

The above rod-like liquid crystal molecule preferably has a polymerizable group in order to fix the alignment state thereof. The polymerizable group is preferably a radical polymerizable unsaturated group or a cation polymerizable group. Specific examples thereof may include polymerizable groups and polymerizable liquid crystal compounds described in paragraphs [0064] to [0086] of JP-A-2002-62427.

2) Disk-Like Liquid Crystal Molecule

Examples of the disk-like (discotic) liquid crystal molecule may include benzene derivatives disclosed in a study report of C. Destrade, Mol. Cryst., vol. 71, page 111 (1981), toluxene derivatives disclosed in a study report of C. Destrade et al., Mol. Cryst., vol. 122, page 141 (1985), and Phyics. Lett., A, vol. 78, page 82 (1990), cyclohexane derivatives disclosed in a study report of B. Kohne, Angew. Chem. Soc., vol. 96, page 70 (1984), and macrocycles of azacrowns and phenylacetylenes disclosed in a study report of J. M. Lehn, J. Chem. Commun., page 1794 (1985), a study report of and J. Zhang et al., and J. Am. Chem. Soc. vol. 116, page 2655 (1994).

The above disk-like liquid crystal molecule may include compounds, which shows liquid crystallization, having a structure in which straight chain groups such as alkyl, alkoxy, and substituted benzoyloxy are radially substituted as side chains of a parent core located at the center of the molecule. The above molecule or a cluster of the molecules is preferably the compound which has rotational symmetry and may provide predetermined alignment. As to the optically anisotropic layer produced from the disk-like liquid crystal molecules, it is unnecessary that the compound which is finally contained in the optically anisotropic layer contains a disk-like liquid crystal molecule. For example, a low molecular weight disk-like liquid crystal molecule having a thermo- or photo-reactive group is polymerized or crosslinked by heat or light to form a compound that does not behave as liquid crystal due to the polymerization. Preferable examples of the disk-like liquid crystal molecule are described in JP-A-1996-50206. Further, JP-A-1996-27284 discloses polymerization of a disk-like liquid crystal molecule.

In order to fix the above disk-like liquid crystal molecule by using the polymerization, it is necessary to bond a polymerizable group as a substituent to the disk-like core of the disk-like liquid crystal molecule. A compound where the disk-like core and the polymerizable group are bonded through a linking group is preferable. Accordingly, the alignment state of the compound may be kept in the polymerization reaction. Examples of the compound may include compounds described in paragraphs [0151] to [0168] of JP-A-2000-155216.

In hybrid alignment, an angle between major axis (disc plane) of disk-like liquid crystal molecule and plane of polarizing film increases or decreases with increase of distance from plane of polarizing film and in the direction of depth of the optically anisotropic layer. The above angle preferably decreases with increase of the distance. Further, examples of variation of the angle may include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The angle may totally increases or decreases in the layer, even if it does not vary in the course. It is preferable that the angle continuously vary.

An average direction of a major axis of a disk-like liquid crystal molecule on the polarizing film side may be generally controlled by selecting the disk-like liquid crystal molecule or materials of the alignment layer, or by selecting methods for the rubbing treatment. The direction of the major axis (disc plane) of disk-like liquid crystal molecule on the surface side (air side) may be generally controlled by selecting the disk-like liquid crystal molecule or the type of additives used together with the disk-like liquid crystal molecule. Examples of the additives which are used with disk-like liquid crystal molecule may include plasticizers, surfactants, and synthetic monomers and polymers. Further, the extent of variation of the alignment direction of the major axis may be controlled by the selection of the liquid crystal molecules and the additives.

(Other Compositions of the Optically Anisotropic Layer)

The use of a plasticizer, a surfactant, and a polymerizable monomer together with the above liquid crystal molecules makes it possible to improve the uniformity of the coating film, the strength of the film, the alignment of the liquid crystal molecules, and the like. It is preferable that these are compatible with the liquid crystal molecules and change the inclined angle of the liquid crystal molecules or do not hinder the alignment.

The polymerizable monomer may be a radical polymerizable compound or a cation polymerizable compound. It is preferably a polyfunctional radical polymerizable monomer. Preferably, the polymerizable monomer is a monomer copolymerizable with the above-mentioned liquid crystal compound having the polymerizable group. Examples thereof may include monomers described in paragraphs [0018] to [0020] of JP-A-2002-296423. The addition amount of the compound is in the range of generally 1 to 50% by mass and preferably 5 to 30% by mass based on the disk-like liquid The above-mentioned surfactant may be a known compound. A fluorine-based compound is particularly preferable. Specific examples thereof may include compounds described in paragraphs [0028] to [0056] of JP-A-2001-330725.

Preferably, the polymer which is used together with the disk-like liquid crystal molecules can change the inclined angle of the disk-like liquid crystal molecules.

As an example of these polymers, cellulose acylate may be included. Preferable examples of the cellulose acylate are described in paragraph [0178] of JP-A-2000-155216. In order not to hinder the alignment of the liquid crystal molecules, the addition amount of the polymer is in the range of preferably 0.1 to 10% by mass and more preferably 0.1 to 8% by mass based on the liquid crystal molecules.

The discotic nematic liquid crystal phase-solid phase transition temperature of the disk-like liquid crystal molecule is in the range of preferably 70 to 300° C. and more preferably 70 to 170° C.

[Formation of Optically Anisotropic Layer]

The optically anisotropic layer may be formed by applying a coating solution, which contains the liquid crystal molecule together with the following polymerization initiator or optional components, onto the alignment film.

As the solvent to be used in preparing the coating solution, it is preferable to use an organic solvent. Examples of the organic solvent include amides (for example, N,N-dimethylformamide), sulfoxides (for example, dimethyl sulfoxide), heterocyclic compounds (for example, pyridine), hydrocarbons (for example, benzene and hexane), alkyl halides (for example, chloroform, dichloromethane, and tetrachloroethane), esters (for example, methyl acetate and butyl acetate), ketones (for example, acetone, methyl ethyl ketone), and ethers (for example, tetrahydrofuran and 1,2-dimethoxyethane). Alkyl halides and ketones are preferable. It is possible to use two or more organic solvents together.

The coating solution can be applied by using a known method (for example, the wire bar coating method, the extrusion coating method, the direct gravure coating method, the reverse gravure coating method, or the die coating method).

The thickness of the optically anisotropic layer is in the range of preferably 0.1 to 20 µm, more preferably 0.5 to 15 µm, and particularly preferably 1 to 10 µm.

(Fixing of the Alignment State of Liquid Crystal Molecules)

The aligned liquid crystal molecules may be fixed while the alignment state is maintained. The fixation is preferably carried out by using the polymerization reaction. Examples of the polymerization reaction include a heat polymerization reaction with the use of a heat polymerization initiator and a photopolymerization reaction with the use of a photopolymerization initiator. The photopolymerization reaction is preferable.

Examples of the photopolymerization initiator include α-carbonyl compounds (described in U.S. Pat. Nos. 2,367,661 and 2,367,670), acyloin ethers (described in U.S. Pat. No. 2,448,828), 1-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-1985-105667 and U.S. Pat. No. 4,239,850), and oxadiazol compounds (described in U.S. Pat. No. 4,212,970).

It is preferable to use the photopolymerization initiator in an amount of 0.01 to 20% by mass, more preferably 0.5 to 5% by mass, based on the solid matters in the coating solution.

In the light radiation for polymerizing the liquid crystal molecule, it is preferable to use ultraviolet rays.

The radiation energy preferably ranges from 20 to 50 mJ/cm$^2$, more preferably ranges from 20 to 5000 mJ/cm$^2$, and particularly preferably ranges from 100 to 800 mJ/cm$^2$. In order to accelerate the photopolymerization reaction, the light radiation may be carried out under heating.

A protective layer may be formed on the optically anisotropic layer.

(Combination with the Polarizing Film)

It is preferable to combine this optically compensating film with a polarizing film. Specifically, a coating solution for forming optically anisotropic layers, as described above, is applied onto the surface of a polarizing film, thereby forming an optically anisotropic layer. As a result, produced is a thin polarizing plate having only small stress (strain×sectional area×elastic modulus) with a change in the size of the polarizing film without using any polymer film between the polarizing film and the optically anisotropic layer. By providing a polarizing plate using the cellulose acylate film according to the aspect of the invention into a large-sized liquid crystal display device, images having a high display quality may be obtained without causing problems, such as light leakage.

The inclined angle between the polarizing film and the optically compensating layer is preferably adjusted by stretching the layers in such a manner that the angle is matched with the angle between the transmission axes of two polarizing films adhered onto both surfaces of a liquid crystal cell which constitutes a LCD and the lengthwise or lateral direction of the liquid crystal cell. The angle is generally 45°.

However, in recent years, a device has been developed, in which the angle is not always 45° in respect to the latest transmission, reflection, and semi-transmission type LCDs. Therefore, it is preferable that the stretching direction be optionally adjustable in order to conform to the design of LCD.

[Provision of an Antireflection Layer (Production of an Antireflection Film)]

An antireflection film is generally formed by laying a low refractive index layer, which functions as an antifouling property layer, and at least one layer having a refractive index higher than that of the low refractive index layer (i.e., a high refractive index layer and a middle refractive index layer), on a cellulose acylate film according to the aspect of the invention.

Examples of the method of forming a multilayered film where transparent thin films made of inorganic compounds (such as metal oxides) having different refractive indexes are laminated include a chemical vapor deposition (CVD) method, a physical vapor deposition (PVD) method, and a method of forming a metal compound such as metal alkoxide into a film made of colloidal metal oxide particles by a sol-gel method, and subjecting the film to post-treatment (ultraviolet radiation: JP-A-1997-157855, or plasma treatment: JP-A-2002-327310) to form a thin film.

Meanwhile, as antireflection films having a high productivity, suggested are various antireflection films obtained by laminating thin films, each of which is made of inorganic particles dispersed in a matrix, by coating. Further, as the antireflection film, an antireflection film, which may be an antireflection film produced by making fine irregularities in the topmost surface of the antireflection film formed by coating to give anti-glare property to the surface, may be provided.

The cellulose acylate film according to the aspect of the invention may be applied to an antireflection film produced by using any one of the above-mentioned methods, but it is particularly preferable to apply the cellulose acylate film to the antireflection film produced by coating method (coating type).

[Layer Structure of the Coating Type Antireflection Film]

According to the aspect of the invention, an antireflection film at least having a layer structure obtained by sequentially forming, on a cellulose acylate film, a middle refractive index layer, a high refractive index layer, and a low refractive index layer (the outermost layer), is designed to have refractive indexes satisfying the following relationship:

the refractive index of the high refractive index layer>the refractive index of the middle refractive index layer>the refractive index of the cellulose acylate film>the refractive index of the low refractive index layer.

A hard coating layer may be formed between the cellulose acylate film and the middle refractive index layer. Further, the antireflection film may be composed of a middle refractive index hard coating layer, a high refractive index layer, and a low refractive index layer. With regard the above antireflection film, examples thereof are described in JP-A-1996-122504, JP-A-1996-110401, JP-A-1998-300902, JP-A-2002-243906, and JP-A-2000-111706.

Different functions may be provided to the layers. Examples of the layers may include a low refractive index layer having antifouling property and a high refractive index layer having antistatic property (for example, JP-A-1998-206603, JP-A-2002-243906, and the like).

The haze of the antireflection film is preferably 5% or less and more preferably 3% or less. The strength of the film is preferably H or more, more preferably 2H or more, and particularly preferably 3H or harder, in terms of the pensile hardness test, according to JIS K5400.

(High Refractive Index Layer and Middle Refractive Index Layer)

The higher refractive index layer of the antireflection film is formed of a curable film containing at least inorganic compound superfine particles having a high refractive index and an average particle size of 100 nm or less, and matrix binder.

The inorganic compound fine particles having the high refractive index may be made of an inorganic compound having a refractive index of 1.65 or more and preferably a refractive index of 1.9 or more. Examples of the inorganic compound fine particles having the high refractive index may include oxides of Ti, Zn, Sb, Sn, Zr, Ce, Ta, La, In, and the like, and composite oxides containing these metal atoms.

In order to ensure the superfine particles, a process in which the particles whose surface is treated with a surface-treating agent (for example, a process of performing treatment by using a silane coupling agent disclosed in JP-A-1999-295503, JP-A-1999-153703, and JP-A-2000-9908, or a process of performing treatment by using an anionic compound or an organometallic coupling agent disclosed in JP-A-2001-310432 and the like), a process in which a core-shell structure is formed to have high refractive index particles as a core (for example, a process disclosed in JP-A-2001-166104), and a process using a specific dispersing agent (for example, a process disclosed in JP-A-1999-153703, U.S. Pat. No. 6,210,858B1, JP-A-2002-2776069, and the like) may be used. The material which forms the matrix binder may be any one of known thermoplastic resins and thermosetting resins film.

Further, the material which forms the matrix binder is preferably at least one composition selected from a composition including a polyfunctional compound containing at least two radical polymerizable groups and/or cation polymerizable groups, a composition including an organometallic compound containing a hydrolyzable group, and a composition including a partial condensate thereof. The compounds used in the composition may be compounds that are described in JP-A-2000-47004, JP-A-2001-315242, JP-A-2001-31871, JP-A-2001-296401, and the like.

Further, a curable film obtained from a colloidal metal oxide and a metal alkoxide composition formed from a hydrolysis condensate of a metal alkoxide is preferably used. Examples thereof may include curable films that are described in JP-A-2001-293818 and the like.

The refractive index of the high refractive index layer is generally in the range of 1.70 to 2.20. The thickness of the high refractive index layer is in the range of preferably 5 nm to 10 μm and more preferably 10 nm to 1 μm.

The refractive index of the middle refractive index layer is adjusted so as to become a value between the refractive index of the low refractive index layer and the refractive index of the high refractive index layer. The refractive index of the middle refractive index layer is preferably in the range of 1.50 to 1.70.

[Low Refractive Index Layer]

The low refractive index layer is laminated on the high refractive index layer. The low refractive index layer has a refractive index generally in the range of 1.20 to 1.55 and preferably in the range of 1.30 to 1.50.

The above low refractive index layer is preferably formed as an outermost layer having scratch resistance and antifouling property. In order to significantly improve the scratch resistance, it is effective to give lubricity to the surface. Specifically, it is possible to use the method of forming the thin film layer by using known silicone compounds or fluorine-containing compounds.

The refractive index of the fluorine-containing compound is preferably 1.35 to 1.50 and more preferably 1.36 to 1.47. The preferable fluorine-containing compound is the compound that contains 35 to 80% by mass of fluorine atoms and has crosslinkable or polymerizable functional groups.

As the above fluorine-containing compounds, compounds that are described in paragraphs [0018] to [0026] of JP-A-1997-222503, paragraphs [0019] to [0030] of JP-A-1999-38202, paragraphs [0027] to [0028] of JP-A-2001-40284, JP-A-2000-284102, and the like may be used.

Preferably, the above silicone compound is a compound which has a polysiloxane structure, and a compound which contains, in the polymer chain thereof, a curable functional group or polymerizable functional group so as to have a crosslinked structure in the film to be formed. Examples thereof may include reactive silicones (for example, Silaplane manufactured by Chisso Corporation), and polysiloxane containing at both ends thereof silanol groups (JP-A-1999-258403), and the like.

It is preferable to conduct the crosslinking or polymerizing reaction of the fluorine-containing polymer and/or the siloxane polymer having a crosslinkable or polymerizable group, by radiation of light or heating at the same time of or after applying a coating composition for forming an outermost layer containing a polymerization initiator, a sensitizer, and the like.

Further, preferable is a sol-gel cured film obtained by curing an organometallic compound, such as a silane coupling agent, and a silane coupling agent which contains a specific fluorine-containing hydrocarbon group, in the presence of a catalyst, by condensation reaction.

Examples thereof may include silane compounds which contain a polyfluoroalkyl group, or partially-hydrolyzed condensates (compounds disclosed in JP-A-1983-142958, JP-A-1983-147483, JP-A-1983-147484, JP-A-1997-157582, and JP-A-1999-106704), silyl compounds which contains a poly(perfluoroalkyl ether) group, which is a long chain group containing fluorine (compounds described in JP-A-2000-117902, JP-A-2001-48590, and JP-A-2002-53804), and the like.

It is preferable that the low refractive index layer be made to contain, as an additive other than the above, a filler (for example, silicon dioxide (silica), low refractive index inorganic compound particles having a primary average particle size of 1 to 150 nm made, for example, of fluorine-containing particles (magnesium fluoride, calcium fluoride, barium fluoride, and the like), organic fine particles, as described in paragraphs [0020] to [0038] of JP-A-1999-3820), a silane coupling agent, a lubricant, a surfactant, and the like.

In the case of when the low refractive index layer is positioned beneath the outermost layer, the low refractive index layer may be formed by using a gas phase method (a vacuum vapor deposition, a sputtering method, an ion plating method, a plasma CVD method, or the like). The low refractive index layer is preferably formed by using a coating method because the layer can be formed at low costs.

The thickness of the low refractive index layer is preferably 30 to 200 nm, more preferably 50 to 150 nm, and particularly preferably 60 to 120 nm.

(Hard Coating Layer)

The hard coating layer may be formed on the surface of the cellulose acylate film to provide a sufficient mechanical strength to an antireflection film. Particularly, the hard coating layer is preferably disposed between the cellulose acylate film and the above high refractive index layer.

The hard coating layer is preferably formed by crosslinking reaction or polymerizing reaction of a curable compound through light and/or heat. The curable functional group is preferably a photopolymerizable functional group, and an organometallic compound which contains a hydrolyzable functional group is preferably an organic alkoxysilyl compound.

Specific examples of these compounds are the same as those of the high refractive index layer.

Specific examples of the composition which constitutes the hard coating layer may include matters described in JP-A-2002-144913, JP-A-2000-9908, and WO 0/46617.

The above high refractive index layer may act as a hard coating layer. In this case, it is preferable to use the manner described about on the high refractive index layer, to disperse particles finely to be incorporated into the hard coating layer to be formed.

The hard coating layer may contain particles having an average particle size of 0.2 to 10 μm, so as to be caused to function as an anti-glare layer. The anti-glare layer has an anti-glare function, which will be detailed in the below.

The film thickness of the hard coating layer may be appropriately set according to the purpose thereof. The film thickness of the hard coating layer is preferably 0.2 to 10 μm and more preferably 0.5 to 7 μm.

The strength of the hard coating layer is preferably H or harder, more preferably 2H or harder, and particularly preferably 3H or harder, in terms of the pensile hardness, according to a JIS K5400 test. The hard coating layer is preferably one which is less in an abrasion amount of the sample in a taber test according to JIS K5400.

(Forward Scattering Layer)

In the case of when a forward scattering layer is applied to a liquid crystal display device, the forward scattering layer may be provided in order to improve the viewing angle of the display device when the angle of visibility is inclined up and down or right and left. Both of a hard coat function and a forward scattering function may be ensured by dispersing fine particles having different refractive indexes in the above hard coating layer.

For example, processes may be used, which are described in JP-A-1999-38208 in which the forward scattering coefficient is specified, in JP-A-2000-199809 in which the relative refractive indexes of a transparent resin and fine-particles are set to fall in the specific ranges, and in JP-A-2002-107512 in which the haze value is set to 40% or more.

(Other Layers)

In addition to the above-mentioned layers, a primer layer, an anti-static layer, an undercoating layer, or a protective layer may be further formed.

(Coating Methods)

The layers of the antireflection film may be formed by performing coating using a dip coating method, an air knife coating method, a curtain coating method, a roller coating method, a wire bar coating method, a gravure coating method, a micro gravure method, or an extrusion coating method (specification of U.S. Pat. No. 2,681,294).

(Antiglare Function)

The anti-reflection film may have an antiglare function scattering light from the outside. The antiglare function may be obtained by making unevenness in a surface of the anti-reflection film. In the case of when the anti-reflection film has the antiglare function, the haze of the anti-reflection film is preferably 3 to 30%, more preferably 5 to 20%, and most preferably 7 to 20%.

In order to form prominences and depressions on the surface of the antireflection film, any method may be used as long as the method is capable of desirably maintaining the shape of surface. Examples of the method may include a method of using fine particles in the low refractive index layer to form prominences and depressions on the surface of the film (for example, JP-A-2000-271878, and the like), a method of adding a small amount (0.1 to 50% by mass) of relatively large particles (particle size: 0.05 to 2 μm) to the layer (high refractive index layer, middle refractive index layer, or hard coating layer) to be formed beneath the low refractive index layer so as to form a film having an uneven surface, and then forming the low refractive index layer thereon while keeping this uneven surface form to provide the low refractive index layer (for example, JP-A-2000-281410, JP-A-2000-95893, JP-A-2001-100004, JP-A-2001-281407, and the like), and a method of physically transferring prominences and depressions onto the surface of a topmost layer (antifouling layer) formed by coating (for example, JP-A-1988-278839, JP-A-1999-183710, and JP-A-2000-275401 as an embossing method).

<Liquid Crystal Display Device>

The cellulose acylate film according to the aspect of the invention, and the polarizing plate, the retardation film, and the optical film using the cellulose acylate film may be desirably provided in a liquid crystal display. Hereinafter, liquid crystal modes will be described.

(TN Mode Liquid Crystal Display Device)

The liquid crystal display device of TN mode is most frequently used as a color TFT liquid crystal display device, and hence is described in many documents. The alignment state of the liquid crystal cell in the TN mode at the time of black display is the state that rod-like liquid crystal molecules stand up in the central portion of the cell and the rod-like liquid crystal molecules lie down in portions near substrates of the cells.

(OCB Mode Liquid Crystal Display Device)

The liquid crystal display device of OCB mode is a liquid crystal cell of bend alignment mode in which rod-like liquid crystal molecules in upper part and ones in lower part are substantially reversely (symmetrically) aligned. A liquid crystal display device having the liquid crystal cell of bend alignment mode is disclosed in U.S. Pat. Nos. 4,583,825 and 5,410,422. Since rod-like liquid crystal molecules in upper part and lower part of the liquid crystal cell are symmetrically aligned, the liquid crystal cell of bend alignment mode has self-optical compensatory function. Therefore, this liquid crystal mode is referred to as OCB (optically compensated bend) liquid crystal mode.

In the same manner as in the TN mode, in a liquid crystal cell in the OCB mode, the alignment state of the liquid crystal cell at the time of black display is the state that rod-like liquid crystal molecules stand up in the central portion of the cell and the rod-like liquid crystal molecules lie down in portions near substrates of the cells.

EXAMPLES

Hereinafter, the invention will be described in more detail with reference to Examples and Comparative examples. Materials, the amount, the ratio, treatment processes, and the order of treatment which are disclosed in the following Examples may be appropriately changed without deviation from the scope of the invention. However, the scope of the invention is not limited to the following specific examples.

(Evaluation of Physical Properties)

(1) Weight Average Molecular Weight

Measurement was performed by using a GPC device (HLC-8220GPC manufactured by TOSOH CORPORATION) under the following condition to obtain a weight average molecular weight (Mw). In addition, a calibration curve was obtained by using polystyrene (TSK standard polyslen: molecular weight 1050, 5970, 18100, 37900, 190000, and 706000). The obtained average molecular weight was divided by a molecular weight per one repeating unit that was obtained by using the substitution degree determined by the following method (2) to ensure the degree of weight average polymerization (DPw).

Eluting solution: dimethylformamide (DMF)
Flow rate: 1 ml/min
Detector: RI
Concentration of the sample: 0.5%

(2) Substitution Degree

Area strength ratios of carbon atoms of the cellulose acylate were compared to each other by using a $^{13}$C-NMR method to determine the substitution degree.

(3) Glass Transition Temperature (Tg)

The cellulose acylate film was put onto a measurement pan of DSC in an amount of 20 mg. The film was heated in a nitrogen atmosphere from 30° C. to 240° C. at a heating rate of 10° C./min, and then cooled to 30° C. at a cooling rate of −50° C./min. Next, the temperature was increased again from 30° C. to 240° C., and the temperature at which the base line started to be displaced at low temperatures was set to Tg.

(4) Quantitative Analysis of Fine Particles 10 g of cellulose acylate was dissolved in 40 ml of dichloromethane, dried by using an applicator on a glass plate, and flow cast so as to ensure a thickness of about 50 μm. The resulting structure was observed by using a polarization microscope (parallel and cross nicols), and the amount and size of impurity per unit area were obtained.

(5) Quantitative Analysis of Sulfur Components

About 0.5 g of the dried cellulose acylate sample was carbonized in an electric furnace to measure the amount of sulfur components by using an oxidation decomposition coulometrical titration method.

(6) Quantitative Analysis of Metal

About 0.5 g of the dried cellulose acylate sample was nitrocarburized by using a multiwave method to measure the amounts of sodium, potassium, calcium, and magnesium using ICP.

Example 1

Synthetic Example 1

Cellulose Acetate Propionate P-1, P-11

10 parts by mass of cellulose (hardwood pulp) and 5 parts by mass of acetic acid were put into a reactor and left at 25° C. for 1 hour (pretreatment). After the reactor was cooled to 0° C., a mixture of 103 parts by mass of propionic anhydride and 1.0 parts by mass of sulfuric acid was prepared, cooled to −10° C., and added to the cellulose that was subjected to the pretreatment in advance all at once. After 30 min, the temperature of the outside of the reactor was increased to 30° C. and the reaction was continued for 4 hours. The reactor was cooled in an ice bath at 5° C. and 120 parts by mass of acetic acid containing 25% of water was added for 30 min. The temperature of the inside of the reactor was increased to 60° C. and agitation was performed for 2 hours. 50% aqueous solution of magnesium acetate tetrahydrate was added in an amount of 10 parts by mass, and agitation was performed for 30 min.

75 parts by mass of acetic acid containing 25% of water and 250 parts by mass of water were slowly added to precipitate cellulose acetate propionate. After washing was performed using hot water at 70° C. until the pH of the washing solution was 6 to 7, agitation was performed for 0.5 hours in a 0.001% aqueous solution of calcium hydroxide to achieve filtration. The obtained cellulose acetate propionate P-1 was dried at 70° C. According to $^1$H-NMR and GPC measurements, the cellulose acetate propionate thus obtained had the acetylation degree of 0.16, the propionylation degree of 2.55, and the weight average molecular weight of 135,000. Furthermore, the melt viscosity of cellulose propionate was 840 Pa·s at 230° C.

100 parts by mass of cellulose acetate propionate P-1 and 2000 parts by mass of acetic acid were mixed with each other and agitated at 40° C. to produce a homogeneous solution. The solution was sequentially filtered by using a filtering paper made of cellulose fibers (retention particle size of 40 μm), a sintered metal filter (retention particle size of 10 μm), and a sintered metal filter (retention particle size of 10 μm) while being pressurized to remove impurities. In addition, 75 parts by mass of acetic acid containing 25% of water and 250 parts by mass of water were slowly added to precipitate cellulose acetate propionate. After washing was performed using hot water at 70° C. until the pH of the washing solution was 6 to 7, agitation was performed for 0.5 hours in a 0.001% aqueous solution of calcium hydroxide to achieve filtration. The obtained cellulose acetate propionate was dried at 70° C. According to $^1$H-NMR and GPC measurements, the cellulose acetate propionate P-11 thus obtained had the acetylation degree of 0.16, the propionylation degree of 2.55, and the weight average molecular weight of 134,000. Furthermore, the melt viscosity of cellulose acylate was 830 Pa·s at 230° C.

Synthetic Example 2

Cellulose Acetate Propionate P-2, P-12

150 parts by mass of cellulose (linter) and 100 parts by mass of acetic acid were put into a reactor and left at 25° C. for 1 hour (pretreatment). After the reactor was cooled to 0° C., a mixture of 1545 parts by mass of propionic anhydride and 10.5 parts by mass of sulfuric acid was prepared, cooled to −15° C., and added to the cellulose that was subjected to the pretreatment in advance all at once. After 30 min, the temperature of the outside of the reactor was slowly increased and controlled to be 30° C. 2 hours after an acylation agent was added. The reactor was cooled in an ice bath at 5° C. and controlled so as to have the inside temperature of 10° C. 5 hours after the acylation agent was added. 120 parts by mass of acetic acid containing 25% water that was cooled to 5° C. was added for 1 hour. The inside temperature was increased to 60° C. and agitation was performed for 2 hours. A solution in which magnesium acetate tetrahydrate was dissolved in an amount two times as high as a mole concentration of sulfuric acid was added to an acetic acid containing 50% water, and agitation was performed for 30 min.

1000 parts by mass of acetic acid containing 25% of water, 500 parts by mass of acetic acid containing 33% of water, 500 parts by mass of acetic acid containing 50% of water, and 1000 parts by mass of water were sequentially added to precipitate cellulose acetate propionate. After washing was performed using hot water at 70° C. until the pH of the washing solution was 6 to 7, agitation was performed for 0.5 hours in a 0.001 wt % aqueous solution of calcium hydroxide at 20° C. to achieve filtration. The obtained cellulose acetate propionate was dried in a vacuum at 70° C. According to $^1$H-NMR and GPC measurements, the cellulose acetate propionate P-2 thus obtained had the acetylation degree of 0.40, the propionylation degree of 2.45, and the weight average molecular weight of 129,000. Furthermore, the melt viscosity of cellulose propionate was 790 Pa·s at 230° C.

In respect to the cellulose acetate propionate P-2, the dissolution and the filtration were performed by using the same procedure as P-1 to obtain the cellulose acetate propionate P-12. According to $^1$H-NMR and GPC measurements, the cellulose acetate propionate P-12 thus obtained had the acetylation degree of 0.40, the propionylation degree of 2.45, and the weight average molecular weight of 127,000. Furthermore, the melt viscosity of cellulose propionate was 800 Pa·s at 230° C.

Synthetic Example 3

Cellulose Acetate Butyrate B-1

10 parts by mass of cellulose (hardwood pulp) and 13.5 parts by mass of acetic acid were put into a reactor and left at 25° C. for 1 hour. After the reactor was cooled to 0° C., a mixture of 108 parts by mass of butyric anhydride and 1.0 parts by mass of sulfuric acid was prepared, cooled to −20° C., and added to the cellulose that was subjected to the pretreatment in advance all at once. After 1 hour, the temperature of the outside of the reactor was increased to 27° C. and the reaction was continued for 6 hours. The reactor was cooled in an ice bath at 5° C. and 120 parts by mass of acetic acid containing 25% of water was added for 30 min. The temperature of the inside of the reactor was increased to 60° C. and agitation was performed for 2.5 hours. 50% aqueous solution of magnesium acetate tetrahydrate was added in an amount of 10 parts by mass, and agitation was performed for 30 min.

75 parts by mass of acetic acid containing 25% of water and 250 parts by mass of water were slowly added to precipitate cellulose acetate butyrate. After washing was performed using hot water at 70° C. until the pH of the washing solution was 6 to 7, agitation was performed for 0.5 hours in a 0.002% aqueous solution of calcium hydroxide to achieve filtration. The obtained cellulose acetate butyrate B-1 was dried at 70° C. According to $^1$H-NMR and GPC measurements, the cellulose acetate butyrate B-1 thus obtained had the acetylation degree of 0.80, the butyrylation degree of 1.95, and the weight average molecular weight of 127,000. Furthermore, the melt viscosity of cellulose propionate was 720 Pa·s at 230° C.

In respect to the cellulose acetate butyrate B-1, the dissolution and the filtration were performed by using the same procedure as P-1 to obtain the cellulose acetate butyrate B-11.

The cellulose acetate butyrate B-11 thus obtained had the acetylation degree of 0.80, the butyrylation degree of 1.95, and the weight average molecular weight of 127,000. Furthermore, the melt viscosity of cellulose butyrate was 710 Pa·s at 230° C.

Synthetic Example 4

The procedure of Synthesis Example 1 was repeated to produce cellulose acetate propionate P-21, except that Celite 545 (goods manufactured by Celite Corporation and particle size was 20 to 80 μm) was added in an amount of 10% by mass based on the weight of solution immediately before the filtration and agitation and dispersion were then performed. The obtained cellulose acetate propionate P21 had the acetylation degree of 0.16, the propionylation degree of 2.55, and the weight average molecular weight of 132,000. Furthermore, the melt viscosity of cellulose acylate was 830 Pa·s at 230° C.

Synthetic Example 5

Synthesis of Cellulose Acetate Propionate P-3

0.1 parts by mass of acetic acid and 2.7 parts by mass of propionic acid were sprayed on 10 parts by mass of cellulose (hardwood pulp), and stored at room temperature for 1 hour. Separately, a mixture of 1.2 parts by mass of acetic anhydride, 61 parts by mass of propionic anhydride, and 0.7 parts by mass of sulfuric acid was prepared, cooled to −10° C., and mixed with the cellulose that was subjected to the pretreatment in advance in a reactor. After 30 min, the temperature of the outside of the reactor was increased to 30° C. and the reaction was continued for 4 hours.

About 10 g of solution was sampled from the reaction solution, added to the acetic acid aqueous solution to perform reprecipitation, washed with hot water, and dried, and an average molecular weight thereof was obtained by using the GPC method. In connection with this, a number average molecular weight was 55400 and a weight average molecular weight was 138,400.

A reaction finishing agent that was produced by cooling 46 parts by mass of acetic acid containing 25% water to −5° C. was added while a reaction device was cooled so as to prevent the temperature of the reaction mixture from being 23° C. or more. In this connection, the required time was 20 min. The reaction solution was sampled and the average molecular weight was measured by using the same procedure as the case of before the reaction was finished. In connection with this, a number average molecular weight was 55,300 and a weight average molecular weight was 137,900.

The inside temperature was increased to 60° C. and agitation was performed for 2 hours. A solution in which magnesium acetate tetrahydrate, an acetic acid, and water were mixed with each other in the same amount was added in an amount of 6.2 parts by mass, and agitation was performed for 30 min. The reaction solution was sequentially filtered by using sintered metal filters having retention particle sizes of 40 μm, 10 μm, and 5 μm while being pressurized to remove impurities. The reaction solution after the filtration was mixed with an acetic acid containing 75% of water to precipitate cellulose acetate propionate, and washing was performed using hot water at 70° C. until the pH of the washing solution was 6 to 7. In addition, agitation was performed for 0.5 hours in a 0.001% aqueous solution of calcium hydroxide, and filtration was then conducted. The obtained cellulose acetate propionate was dried at 70° C. According to $^1$H-NMR measurements, the cellulose acetate propionate P-3 thus obtained had the acetylation degree of 0.15, the propionylation degree of 2.62, total acyl substitution degree of 2.77, the number average molecular weight of 54500 (number average polymerization degree DPn=173), the weight average molecular weight of 132000 (weight average polymerization degree DPw=419), the remaining sulfuric acid content of 45 ppm, the magnesium content of 8 ppm, the calcium content of 46 ppm, the sodium content of 1 ppm, the potassium content of 1 ppm, and the iron content of 2 ppm. Furthermore, the melt viscosity of cellulose acetate propionate was 780 Pa·s at 230° C.

In respect to the cellulose acetate propionate P-3, the dissolution and the filtration were performed by using the same procedure as P-1 to obtain the cellulose acetate propionate P-13. According to $^1$H-NMR and GPC measurements, the cellulose acetate propionate P-13 thus obtained had the acetylation degree of 0.15, the propionylation degree of 2.61, and the weight average molecular weight of 133,000. Furthermore, the melt viscosity of cellulose propionate was 780 Pa·s at 230° C.

Example 2

Production 1 of a Melt Cast Film (1) Preparation of a Sample 0.3% by mass of sumilizer GP (goods manufactured by Sumitomo Chemical Co., Ltd.) as a thermal stabilizer and 1% by mass of ADK STAB LA-31 (goods manufactured by ADEKA CORPORATION) as a ultraviolet absorbing agent were added to cellulose acylate produced in Example 1, the matter of Comparative Example (see Table 1), and CTA-1 (cellulose acetate: acetyl substitution degree of 2.85) that was not within the scope of the invention, and desirably agitated.

(2) Melt Casting

The cellulose acylate was shaped into cylindrical pellets having a diameter of 3 mm and a length of 5 mm and then dried in a vacuum drier at 110° C. for 6 hours so that residual moisture content was 0.01% by mass or less. The pellets were added into a hopper, a temperature of which was controlled to Tm−10° C., and kneading melting was performed in a nitrogen atmosphere at a melting temperature of 230° C. by using a full flight screw having a compression ratio of 3.5 so that a ratio of L (the length of the screw)/D (the diameter of the screw) was 30. In addition, after the breaker plate type of filtration was performed at an outlet of an extruder, the resulting structures passed through a gear pump and a lip disk filter that was made of stainless steel and had the size of 4 μm.

CTA-1 that was not within the scope of the invention could not shaped into pellets under the above-mentioned condition.

The pellets other than CTA-1 were extruded through a T die and cast by using the touch roll that was disclosed in Example 1 of JP-A-1999-235747. The resulting structure was peeled off from the casting roll and wound. Both edges of the structure (each side corresponded to 3% of the total width) were trimmed immediately before the winding, knurlings each having a width of 10 mm and a height of 50 μm were attached to the both edges thereof, and the winding was performed to ensure the roll shape. The amount of remaining organic solvent of each of the films (gas chromatography method) was 0.01% by mass or less.

The surface state of each of the films was observed with the naked eye, and the level at which the movable line was not observed was evaluated to be acceptable. In addition, permeability of light was measured in views of 100 μm conversion.

Additionally, the number of impurities having the particle size of 40 μm or more was converted into a value per 1 g of film.

TABLE 1

| Sample | Cellulose acylate | Re (nm) | Rth (nm) | Surface state | Permeability (%) | Amount of impurity | Note |
|---|---|---|---|---|---|---|---|
| 101 | P-1 | 2 | 1 | Nonuniform line | 90 | 14 | Comparative example |
| 102 | P-2 | 1 | 2 | Nonuniform line | 90 | 11 | Comparative example |
| 103 | B-1 | 0 | 1 | Nonuniform line | 90 | 23 | Comparative example |
| 104 | CTA-1 | — | — | — | — | — | Comparative example |

TABLE 1-continued

| Sample | Cellulose acylate | Re (nm) | Rth (nm) | Surface state | Permeability (%) | Amount of impurity | Note |
|---|---|---|---|---|---|---|---|
| 105 | P-11 | 1 | 1 | Acceptable | 92 | 0.01 | Present invention |
| 106 | P-12 | 0 | 1 | Acceptable | 92 | 0.005 | Present invention |
| 107 | P-21 | 0 | 1 | Acceptable | 92 | 0.003 | Present invention |
| 108 | B-11 | −1 | 1 | Acceptable | 92 | 0.005 | Present invention |

It was confirmed that the film which was produced by using the cellulose acylate according to the aspect of the invention had the very small amount of impurity and acceptable physical properties. P-21 that was produced by using the filtration had the particularly small amount of impurity. Meanwhile, the samples of Comparative Examples P-1, P-2, P-3, and B-1 had the very large amount of impurity and the poor surface state. Thus, it is difficult to commercialize the samples of Comparative Examples as optical films.

(Production and Evaluation of the Stretched Film)

The produced cellulose acylate films (unstretched cellulose acylate films) were subjected to 15% TD stretching at the temperature that was 10° C. higher than Tg of the cellulose acylate film (stretched cellulose acylate film). The cellulose acylate film that was produced by using the production method according to the aspect of the invention had acceptable transparency even when the cellulose acylate film was stretched.

TABLE 2

| Sample | Cellulose acylate | Re (nm) | Rth (nm) | Surface state | Permeability (%) | Note |
|---|---|---|---|---|---|---|
| 201 | P-1 | 40 | 63 | Nonuniform line | 90 | Comparative example |
| 202 | P-2 | 45 | 70 | Nonuniform line | 90 | Comparative example |
| 203 | B-1 | 50 | 76 | Nonuniform line | 90 | Comparative example |
| 204 | P-3 | 35 | 55 | Nonuniform line | 90 | Comparative example |
| 205 | P-11 | 42 | 68 | Acceptable | 92 | Present invention |
| 206 | P-12 | 46 | 73 | Acceptable | 92 | Present invention |
| 207 | P-21 | 41 | 68 | Acceptable | 92 | Present invention |
| 208 | B-11 | 49 | 78 | Acceptable | 92 | Present invention |
| 209 | P-13 | 35 | 53 | Acceptable | 92 | Present invention |

Example 3

Production of the Melt Cast Film (Production of the Cellulose Acylate Solution)
(i) Preparation of the Solvent The solvent that contained compositions of dichloromethane (82.0% by mass), methanol (15.0% by mass), and butanol (3.0% by mass) was prepared.

(ii) Drying of the Cellulose Acylate Composition

The cellulose acylate composition was dried so that the water content was 0.5% or less.

(iii) Addition of Additives

Additives of the following compositions were added to the solvent obtained in step i. Furthermore, the following addition amounts (mass %) are all ratios with respect to the steady dry weight of the cellulose acylates.

| [Composition of additives] | |
|---|---|
| Plasticizer A (triphenyl phosphate) | 3.1% by mass |
| Plasticizer B (biphenyldiphenyl phosphate) | 1% by mass |
| Optically anisotropy controlling agent (plate-shaped compound described in (Chemical Formula 1) of JP-A-2003-66230 | 2.95% by mass |
| UV agent a (2,4-bis-(n-octylthio)-6-(4-hydroxy-3,5-di-tert-butylanilino)-1,3,5-triazine) | 0.5% by mass |
| UV agent b (2(2'-hydroxy-3',5'-di-tert-butylphenyl)-5-chlorobenzotriazole | 0.2% by mass |
| UV agent c (2(2'-hydroxy-3',5'-di-tert-amylphenyl)-5-chlorobenzotriazole) | 0.1% by mass |
| Citric acid ethyl ester (monoester:diester = 1:1) | 0.2% by mass |

(iv) Swelling-Dissolution

The cellulose acylate of step ii was added with agitation to the solution containing the additives obtained in step iii. After stopping the agitation, the cellulose acylate was subjected to swelling at 25° C. for 3 hours to produce slurry. The slurry was stirred again to completely dissolve the cellulose acylate.

(v) Filtration-Concentration

Next, the slurry was filtered through a filter paper having an absolute filtration precision of 0.01 mm (Toyo Roshi Co., Ltd., #63) and additionally filtered through a filter paper having an absolute filtration precision of 2.5 μm (Pall, Ltd., FH025) to obtain a cellulose acylate solution. The concentration of the cellulose acylate solution was 25% by mass (total solids content×100/(total solids content+amount of solvent)).

(Solution Casting)

The cellulose acylate solution described above was warmed up to 35° C. and flow cast on a mirror-surfaced stainless steel support by the following band method. According to the band method, the cellulose acylate solution was flow cast through a delivery valve on a mirror-surfaced stainless steel support with a band of 60 m in length and maintained at 15° C. The delivery valve used was one similar to the type described in JP-A-1999-314233. Additionally, the temperature in the chamber of the flow casting part was set at 40° C., and the air for heat supply was blown at a rate of 30 m/sec. At the point when the remaining solvent reaches 100% by mass, the cellulose acylate film was peeled off from the mirror-surfaced stainless steel support at a load of 20 g/cm, and the temperature was elevated (temperature elevation or lowering) between 40° C. and 120° C. such that the rate of temperature elevation was 30° C./min. Subsequently, the cellulose acylate film was dried at 120° C. for 5 minutes and at 145° C. for 20 minutes, and then slowly cooled at a rate of 30°

C./min to obtain a cellulose acylate film. The obtained film was trimmed by 3 cm at both edges, provided with knurling of 100 μm in height at positions 2 to 10 mm away from both edges, and taken up by winding on a roll.

Re, Rth, the surface state, and the light permeability of the cellulose acylate film produced by the above-mentioned method were evaluated.

Like the melt casting method, the cellulose acylate film that was produced by using the solution casting method had the small amount of impurity and acceptable physical properties.

Additionally, in respect to the cellulose acylate film that was produced by using the solution casting method, the stretched film was produced by using the same procedure as the cellulose acylate film that was produced by the melt casting method. Accordingly, the cellulose acylate film that was produced by using the production method according to the aspect of the invention had acceptable transparency.

Example 4

Production 2 of the Melt Cast Film (1) Preparation of Cellulose Acylate

The samples that were disclosed in Examples 1 to 5 and Comparative Examples 1 to 3 were used.

(2) Pelletization of Cellulose Acylate 80 parts by weight of the above-mentioned cellulose acylate, 20 parts by weight of pieces that were obtained by pulverizing edges of the cellulose acylate film as described below, and 0.3 parts by weight of stabilizer (sumilizer GP manufactured by Sumitomo Chemical Co., Ltd.) were mixed with each other. These were dried at 100° C. for 3 hours so that the water content was 0.1 wt % or less, melted at 180° C. by using a twin screw kneader, extruded in hot water at 60° C. to form strands, and cut to produce cylindrical pellets having a diameter of 3 mm and a length of 5 mm.

(3) Melt Casting

The pellets were dried at 100° C. for 5 hours by using a dehumidification wind at a dew point of −40° C. so that the water content was 0.01 wt % or less, charged into a hopper of a uniscrew kneading extruder at 80° C., and melted by using a melt extruder that was adjusted at 180° C. (inlet temperature) to 230° C. (outlet temperature). In addition, the diameter of the used screw was 60 mm, L/D was 50, and a compression ratio was 4. The resin that was extruded from the melt extruder was transported after the amount thereof was gauged by using a gear pump. In connection with this, the number of rotation of the extruder was changed so that the resin pressure before the gear pump was controlled to 10 MPa. The melt resin that was transported from the gear pump was filtered by using the lip disk filter having filtration precision of 5 μmm, and the melt (the melt of cellulose acylate) was extruded from a hanger coat die having a slit interval of 0.8 mm at 230° C. through a static mixer to a casting drum (CD). The melt was extruded on three continuous cast rolls at Tg (the glass transition temperature)−5° C., Tg, and Tg−10° C., and a touch roll came into contact with the cast roll of the uppermost stream so that the applied pressure was 1.5 MPa. In addition, the temperature of the touch roll was controlled to Tg−5° C. by using the device that was disclosed in Example 1 of JP-A-1999-235747 (double suppression roll) (the outer thickness of the thick metal cylinder was set to 3 mm). The term "applied pressure" means a value that is obtained by dividing a load applied to the touch roll by a contact area of the touch roll and the casting roll.

The solidified melt was peeled off from the casting drum, and both edges thereof (5% of the total width) were trimmed immediately before the winding. The trimmed melt was cut to sizes of 0.5 cm², and dissolved again during the pelletization to be used as the raw material of the film.

After the trimming, knurlings each having a width of 10 mm and a height of 50 μm are attached to both edges of the cast film to obtain an unstretched film having a width of 1.5 m and a length of 3000 m at 30 m/minute. Tg was measured by using DSC through the following method, and the results are described in Table 1.

(Measurement of Tg) 20 mg of the sample was put into a measurement pan of DSC. The sample was heated in a nitrogen atmosphere from 30° C. to 250° C. at 10° C./min (1st-run), and then cooled to 30° C. at −10° C./min. Next, the temperature was increased from 30° C. to 250° C. (2nd-run). During the 2nd-run, the temperature at which the base line started to be leaned from the low temperature was considered as the glass transition temperature (Tg).

In addition, the amount of remaining solvent of the film was measure by using the above-mentioned method. As a result, the remaining solvent was not measured.

(4) Evaluation of the Cast Film

Physical properties of the cellulose acylate film were measured by using the same method as Example 2. In this Example, the film that was produced by using the cellulose acylate according to the production method of the aspect of the invention had the small amount of fine impurity, the die line or the stage of the film surface that were not nonuniform, and the desirable surface state.

Example 5

Application of the Cellulose Acylate Film (Production and Evaluation of the Stretched Film)

The cellulose acylate films (unstretched cellulose acylate films) that were produced in Examples 2 to 4 were subjected to 15% TD stretching at the temperature that was 10° C. higher than Tg of each cellulose acylate film (stretched cellulose acylate film).

(Production and Evaluation of a Polarizing Plate)

(1) Saponification of the Cellulose Acylate Film

The unstretched cellulose acylate film and the stretched cellulose acylate film were subjected to the saponification by using the following method.

A 1.5 mol/L aqueous solution of sodium hydroxide was used as saponification liquid. This saponification liquid was heated to 60° C., and the cellulose acylate film was immersed for two minutes. Next, the cellulose acylate film was immersed in a 0.05 mol/L aqueous solution of sulfuric acid for 30 seconds and then passed through a washing bath using water.

(2) Production of a Polarizing Layer

According to Example 1 described in JP-A-2001-141926, the cellulose acylate film was passed through two pairs of nip rolls with different rim speeds to stretch the film longitudinally, and thus a polarizing layer having a thickness to 20 μm was produced.

(3) Lamination and Evaluation

The polarizing layer thus obtained and two sheets selected from the unstretched and stretched cellulose acylate films saponified in such a manner as described above were adhered such that the polarizing layer was interposed between the cellulose acylate films and then the films were adhered using a 3% aqueous solution of PVA (PVA-117H, manufactured by KURARAY Co. Ltd. as an adhesive agent so that the polarizing axis and the longitudinal direction of the cellulose acylate films met at 90°. Among these, the unstretched and stretched cellulose acylate films were mounted on a 20-in VA type liquid crystal display device described in FIG. 2-9 in JP-A-2000-154261 at 25° C. and relative humidity of 60%, and this was provided at 25° C. and relative humidity of 10%. By using the cellulose acylate film that was produced using the production method according to the aspect of the invention, acceptable performance with small color tone change and less display unevenness could be obtained.

Further, when a polarizing plate was produced by using the cellulose acylate film of the invention in the same manner as in the polarizing plate stretched according to Example 1 of JP-A-2002-86554, using a tenter so that the axis of stretching was inclined 45°, acceptable results could be obtained as in the above.

(Production and Evaluation of an Optical Compensation Film)

Instead of the cellulose acetate film coated with the liquid crystal layer of Example 1 of JP-A-1999-316378, the stretched cellulose acylate films according to the aspect of the invention which had been subjected to saponification were mounted on the bend-aligned liquid crystal cell described in Example 9 of JP-A-2002-62431 at 25° C. and a relative humidity of 60%, and this was provided to 25° C. and a relative humidity of 10%. By using the cellulose acylate film that was obtained using the production method according to the aspect of the invention, acceptable display performance with small light leakage and contrast change could be obtained.

Moreover, an optical compensation filter film was produced using the stretched cellulose acylate film, instead of the cellulose acetate film coated with a liquid crystal layer of Example 1 of JP-A-1995-333433. In this case, acceptable optical compensation film could be obtained.

Further, the polarizing plate and the phase difference polarizing plate employing the cellulose acylate films that was produced using the production method according to the aspect of the invention were used in the liquid display device described in Example 1 of JP-A-1998-48420, the optically anisotropic layer containing discotic liquid crystal molecules and the alignment film coated with polyvinyl alcohol described in Example 1 of JP-A-1997-26572, the 20-in VA type liquid crystal display device shown in FIGS. 2 to 9 of JP-A-2000-154261, the 20-in OCB type liquid crystal display device shown in FIGS. 10 to 15 of JP-A-2000-154261, and the IPS type liquid crystal display device shown in FIG. 11 of JP-A-2004-12731. In this connection, acceptable liquid crystal display devices having very small light leakage were obtained. Meanwhile, in the case of when a liquid crystal display device that was produced using cellulose acylate C-1 by a method other than the production method according to the aspect of the invention was subjected to black displaying in a dark space, light leakage was observed.

(Production and Evaluation of a Low Reflection Film)

A low reflection film was produced by using the above-described stretched cellulose acylate film according to Example 47 of the Journal of Technical Disclosure of the Japan Institute of Invention and Innovation (Article No. 2001-1745, published on Mar. 15, 2001, Japan Institute of Invention and Innovation), and acceptable optical performance could be obtained by using the cellulose acylate film that was produced using the production method according to the aspect of the invention.

Further, the above-mentioned low reflection film was attached to the outermost layers of the liquid crystal display device described in Example 1 of JP-A-1998-48420, the 20-in VA type liquid crystal display device described in FIGS. 2 to 9 of JP-A-2000-154261, the 20-in OCB type liquid crystal display device described in FIGS. 10 to 15 of JP-A-2000-154261, and the IPS type liquid crystal display device described in FIG. 11 of JP-A-2004-12731, and evaluation was carried out. As a result, acceptable liquid crystal display devices in which insignificant light leakage occurs were obtained.

INDUSTRIAL APPLICABILITY

According to the invention, cellulose acylate which is capable of being desirably used as an optical film and has the very small amount of impurity is produced. Furthermore, the optical film containing cellulose acylate is used to obtain a high grade retardation film, polarizing plate, optical compensation film, anti-reflection film, and image display device. Therefore, the invention is a useful invention with high industrial applicability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 178685/2006 filed on Jun. 28, 2006 and Japanese Patent Application No. 224372/2006 filed on Aug. 21, 2006, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a cellulose acylate composition, which comprises filtering a solution in which cellulose acylate satisfying the following formulae 1 to 3 and having melt viscosity of 150 to 1000 Pas at 230° C. is dissolved in a solvent through a filter having a retention particle size of 0.1 to 40 μm, and mixing the filtered solution with a poor solvent to reprecipitate cellulose acylate:

$$1.5 \leq A+B \leq 3 \qquad \text{Formula 1}$$

$$0 \leq A \leq 2.0 \qquad \text{Formula 2}$$

$$1.0 \leq B \leq 3 \qquad \text{Formula 3}$$

where A is a substitution degree for an acetyl group of a hydrogen atom which constitutes a hydroxyl group of cellulose, and B is a substitution degree for an acyl group having 3 to 7 carbon atoms of a hydrogen atom which constitutes a hydroxyl group of cellulose.

2. The method for producing the cellulose acylate composition according to claim 1, wherein the cellulose acylate used in the solution has a weight average molecular weight measured by a gel permeation chromatography of 80,000 to 180,000.

3. The method for producing the cellulose acylate composition according to claim 1, wherein the filter has a retention particle size of 2 to 20 μm.

4. The method for producing the cellulose acylate composition according to claim 1, wherein a filter aid is used during the filtering.

5. The method for producing the cellulose acylate composition according to claim 1, wherein the reprecipitated cellulose acylate comprises 10 pieces or less of impurity particles having a particle size of 40 μm or more per 100 g of the cellulose acylate.

6. The method for producing the cellulose acylate composition according to claim 1, wherein the reprecipitated cellulose acylate comprises 5 pieces or less of impurity particles having a particle size of 40 μm or more per 100 g of the cellulose acylate.

7. The method for producing the cellulose acylate composition according to claim 1, wherein the cellulose acylate composition is in the form of a solution, a melt, a gel, a pellet, or a film.

8. The method for producing the cellulose acylate composition according to claim 1, wherein the cellulose acylate composition is in the form of a pellet or a film.

* * * * *